US010056950B2

United States Patent
Wu et al.

(10) Patent No.: US 10,056,950 B2
(45) Date of Patent: Aug. 21, 2018

(54) PRECODING MATRIX INDICATOR PMI FEEDBACK METHOD

(71) Applicant: Huawei Technologies Co., Ltd., Shenzhen, Guangdong (CN)

(72) Inventors: Qiang Wu, Beijing (CN); Leiming Zhang, Beijing (CN); Jianqin Liu, Beijing (CN); Kunpeng Liu, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/637,636

(22) Filed: Jun. 29, 2017

(65) Prior Publication Data
US 2017/0310372 A1    Oct. 26, 2017

Related U.S. Application Data

(63) Continuation of application No. PCT/CN2014/095931, filed on Dec. 31, 2014.

(51) Int. Cl.
*H04B 7/0417* (2017.01)
*H04W 72/04* (2009.01)
*H04B 7/0456* (2017.01)
*H04L 5/00* (2006.01)

(52) U.S. Cl.
CPC ......... *H04B 7/0417* (2013.01); *H04B 7/0456* (2013.01); *H04W 72/0413* (2013.01); *H04L 5/0048* (2013.01)

(58) Field of Classification Search
CPC .... H04B 7/0456; H04B 7/0417; H04L 5/0048
USPC .......................... 375/265, 267, 299, 347–349
See application file for complete search history.

(56) References Cited

U.S. PATENT DOCUMENTS

| 9,755,719 B2 * | 9/2017 | Kim ..................... H04B 7/0486 |
| 2013/0070723 A1 | 3/2013 | Yie et al. |
| 2014/0376652 A1 * | 12/2014 | Sayana ................ H04B 7/0639 375/267 |
| 2015/0270881 A1 | 9/2015 | Gao |
| 2016/0056870 A1 | 2/2016 | Gao et al. |
| 2017/0117945 A1 * | 4/2017 | Kim ..................... H04B 7/0486 |

FOREIGN PATENT DOCUMENTS

| CN | 103004104 A | 3/2013 |
| CN | 103780332 A | 5/2014 |
| CN | 104065448 A | 9/2014 |
| EP | 2981014 A1 | 2/2016 |
| WO | 2014176813 A1 | 11/2014 |

* cited by examiner

*Primary Examiner* — Emmanuel Bayard

(57) ABSTRACT

In a 3D MIMO scenario with 16 antenna ports, antenna ports can be extended in different directions because of different configuration manners of the antenna ports. An apparatus and method where different antenna port counting manners are determined in different configurations are provided, so that in different configurations, a matrix whose dimension is 8 and a matrix whose dimension is 2 are determined in a precoding codebook, and a value of a PMI is fed back to indicate a precoding matrix.

20 Claims, 9 Drawing Sheets

US 10,056,950 B2

PRECODING MATRIX INDICATOR PMI FEEDBACK METHOD

CROSS-REFERENCE TO RELATED APPLICATIONS

This application is a continuation of International Application No. PCT/CN2014/095931, filed on Dec. 31, 2014, the disclosure of which is hereby incorporated by reference in its entirety.

TECHNICAL FIELD

The present disclosure relates to the field of wireless communications technologies, and in particular, to a precoding matrix indicator feedback method, user equipment, and base station.

BACKGROUND

A long term evolution (LTE) technology is long term evolution of a universal mobile telecommunications system (UMTS) technology standard formulated by the 3rd generation partnership project (3GPP) organization. Key transmission technologies such as multiple-input multiple-output (MIMO) are introduced into an LTE system. Therefore, spectral efficiency and a data transmission rate are significantly increased. By means of a transmit precoding technology and a receive signal combination technology, a MIMO-based wireless communications system can obtain diversity and array gains. The MIMO-based wireless communications system needs to perform precoding processing on a signal. A signal transmission function based on precoding may be expressed as:

$$y = H\hat{V}s + n,$$

where y represents a received signal vector, H represents a channel matrix, $\hat{V}$ represents a precoding matrix, s represents a transmitted signal vector, and n represents a measurement noise. The transmitted signal vectors on a transmit end passes through the precoding matrix $\hat{V}$ for precoding, and a precoded matrix is obtained. The precoded matrix passes through the channel matrix H, the measurement noise n is added to the precoded matrix, and then the received signal vector y is received on a receive end.

To implement optimal precoding, a transmitter usually needs to obtain channel state information (CSI) in advance. The transmitter and a receiver may be respectively a base station device or a terminal device. In a downlink data transmission process, the transmitter may be a base station device, and the receiver may be a terminal device. A commonly used method is that the terminal device quantizes instantaneous CSI and reports the CSI to the base station.

The CSI information reported by the terminal includes rank indicator (RI) information, precoding matrix indicator (PMI) information, channel quality indicator (CQI) information, and the like. An RI may be used to indicate a transport layer quantity and a precoding matrix $\hat{V}$ that are used for data transmission. A PMI may be used to indicate the precoding matrix $\hat{V}$ used for data transmission. Herein, a precoding matrix V may be determined first by using the PMI, and then $\hat{V}$ is indicated according to the RI or a determined rule.

In some 3D MIMO (3 Dimension MIMO) scenarios, on one carrier, PMIs of two precoding matrices need to be fed back, to respectively indicate a precoding matrix in a vertical direction and a precoding matrix in a horizontal direction. A precoding matrix may be indicated by using a Kronecker product of a precoding matrix in a vertical direction and a precoding matrix in a horizontal direction. A precoding matrix $V_1$ may be expressed as follows:

$$V_1 = A \otimes B,$$

where $\otimes$ indicates a Kronecker product. A size of the matrix $V_1$ is determined by row and column quantities of a precoding matrix A in the vertical direction and row and column quantities of a precoding matrix B in the horizontal direction. Herein, A may also represent a precoding matrix in the horizontal direction, and correspondingly, B represents a precoding matrix in the vertical direction.

Usually, dimensions of A and B are determined by an antenna port quantity. In a process of selecting a codebook, a precoding matrix set needs to be further determined according to a distribution status of antenna ports. User equipment and a base station determine different codebook sets for different antenna port configuration manners. The UE or the base station needs to store the different codebook sets, causing waste of storage resources.

SUMMARY

Embodiments of the present disclosure provide a precoding matrix indicator feedback method, user equipment and a base station, so as to resolve a problem that different codebooks need to be determined for different antenna port configurations, and reduce storage resources.

According to a first aspect, an embodiment of the present disclosure provides a precoding matrix indicator (PMI) feedback method, including: receiving, by user equipment (UE), a reference signal; determining, by the UE, that a quantity of antenna ports used by a base station to transmit the reference signal is 16; determining, by the UE, a precoding matrix from a precoding matrix set corresponding to the 16 antenna ports, where each precoding matrix W in the precoding matrix set satisfies the following relationship: $W = W_1 \otimes W_2$ or $W = W_2 \otimes W_1$, where $W_1$ is a first precoding submatrix, $W_2$ is a second precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2; and sending, by the UE, a precoding matrix indicator (PMI) corresponding to the precoding matrix to the base station.

In a first possible implementation manner of the first aspect, the determining, by the UE, a precoding matrix from a precoding matrix set includes: determining, by the UE, the first precoding submatrix and the second precoding submatrix from the precoding matrix set; and determining, by the UE, the precoding matrix according to the first precoding submatrix and the second precoding submatrix.

With reference to the first aspect or the first possible implementation manner of the first aspect, in a second possible implementation manner, the first precoding submatrix is a precoding submatrix in a first direction, and the second precoding submatrix is a precoding submatrix in a second direction, or the first precoding submatrix is a precoding submatrix in a second direction and the second precoding submatrix is a precoding submatrix in a first direction.

With reference to the second possible implementation manner of the first aspect, in a third possible implementation manner, a configuration manner of the 16 antenna ports includes any one of the following:

two antenna ports are configured in the first direction and eight antenna ports are configured in the second direction;

four antenna ports are configured in the first direction and four antenna ports are configured in the second direction;

eight antenna ports are configured in the first direction and two antenna ports are configured in the second direction; or 16 antenna ports are configured in the first direction and one antenna port is configured in the second direction.

With reference to the third possible implementation manner of the first aspect, in a fourth possible implementation manner, a precoding matrix in the first direction is a precoding matrix in a horizontal direction, and a precoding matrix in the second direction is a precoding matrix in a vertical direction, or a precoding matrix in the first direction is a precoding matrix in a vertical direction, and a precoding matrix in the second direction is a precoding matrix in a horizontal direction.

With reference to any one of the first aspect or the first to the fourth possible implementation manners of the first aspect, in a fifth possible implementation manner, the first precoding submatrix is a product of a third precoding submatrix and a fourth precoding submatrix; and/or the second precoding submatrix is a product of a fifth precoding submatrix and a sixth precoding submatrix.

With reference to any one of the first aspect or the first to the fifth possible implementation manners of the first aspect, in a sixth possible implementation manner, the method includes: determining, by the UE, a bit quantity corresponding to a PMI of $W_1$ and a bit quantity corresponding to a PMI of $W_2$; and determining, by the UE, the PMI of $W_1$ and the PMI of $W_2$ according to the bit quantity corresponding to the PMI of $W_1$ and the bit quantity corresponding to the PMI of $W_2$; and the sending, by the UE, a precoding matrix indicator (PMI) corresponding to the precoding matrix to the base station includes: sending the PMI of $W_1$ and the PMI of $W_2$ to the base station.

With reference to the sixth possible implementation manner of the first aspect, in a seventh possible implementation manner, the determining, by the UE, a bit quantity corresponding to a PMI of $W_1$ and a bit quantity corresponding to a PMI of $W_2$ includes:

receiving, by the UE, bit indication information sent by the base station, where the bit indication information is used to indicate at least one of the bit quantity corresponding to the PMI of $W_1$ or the bit quantity corresponding to the PMI of $W_2$.

According to a second aspect, an embodiment of the present disclosure provides a precoding matrix indicator (PMI) feedback method, including: sending, by a base station, a reference signal to UE by using 16 antenna ports; receiving, by the base station, a precoding matrix indicator (PMI) fed back by the UE; determining, by the base station, a precoding matrix corresponding to the PMI from a precoding matrix set corresponding to the 16 antenna ports, where each precoding matrix W in the precoding matrix set satisfies the following relationship: $W=W_1 \otimes W_2$ or $W=W_2 \otimes W_1$, where $W_1$ is a first precoding submatrix, $W_2$ is a second precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2; and sending, by the base station, data to the UE by using the precoding matrix.

In a first possible implementation manner of the second aspect, a quantity of PMIs is at least two; and the determining, by the base station, a precoding matrix from a precoding matrix set corresponding to the 16 antenna ports includes: determining, by the base station, the first precoding submatrix and the second precoding submatrix according to a PMI of the first precoding submatrix and a PMI of the second precoding submatrix; and determining, by the base station, the precoding matrix according to the first precoding submatrix and the second precoding submatrix.

With reference to the second aspect or the first possible implementation manner of the second aspect, in a second possible implementation manner, the first precoding submatrix is a precoding submatrix in a first direction, and the second precoding submatrix is a precoding submatrix in a second direction, or the first precoding submatrix is a precoding submatrix in a second direction and the second precoding submatrix is a precoding submatrix in a first direction.

With reference to the second possible implementation manner of the second aspect, in a third possible implementation manner, a configuration manner of the 16 antenna ports includes any one of the following:

two antenna ports are configured in the first direction and eight antenna ports are configured in the second direction;

four antenna ports are configured in the first direction and four antenna ports are configured in the second direction;

eight antenna ports are configured in the first direction and two antenna ports are configured in the second direction; or 16 antenna ports are configured in the first direction and one antenna port is configured in the second direction.

With reference to the third possible implementation manner of the second aspect, in a fourth possible implementation manner, a precoding matrix in the first direction is a precoding matrix in a horizontal direction, and a precoding matrix in the second direction is a precoding matrix in a vertical direction, or a precoding matrix in the first direction is a precoding matrix in a vertical direction, and a precoding matrix in the second direction is a precoding matrix in a horizontal direction.

With reference to any one of the second aspect or the first to the fourth possible implementation manners of the second aspect, in a fifth possible implementation manner, the first precoding submatrix is a product of a third precoding submatrix and a fourth precoding submatrix; and/or the second precoding submatrix is a product of a fifth precoding submatrix and a sixth precoding submatrix.

With reference to any one of the second aspect or the first to the fifth possible implementation manners of the second aspect, in a sixth possible implementation manner, the method includes: determining, by the base station, a bit quantity corresponding to the PMI of $W_1$ and a bit quantity corresponding to the PMI of $W_2$; and receiving, by the base station according to the bit quantity of the PMI corresponding to $W_1$ and the bit quantity of the PMI corresponding to $W_2$, the PMI of $W_1$ and the PMI of $W_2$ that are fed back by the UE.

With reference to the sixth possible implementation manner of the second aspect, in a seventh possible implementation manner, the method further includes:

sending, by the base station, bit indication information to the UE, where the bit indication information is used to indicate at least one of the bit quantity corresponding to the PMI of $W_1$ or the bit quantity corresponding to the PMI of $W_2$.

According to a third aspect, an embodiment of the present disclosure provides user equipment (UE), including: a receiving unit, configured to receive a reference signal; a determining unit, configured to: determine that a quantity of antenna ports used by a base station to transmit the reference signal is 16, and determine a precoding matrix from a precoding matrix set corresponding to the 16 antenna ports, where the reference signal is received by the receiving unit, and each precoding matrix W in the precoding matrix set satisfies the following relationship: $W=W_1 \otimes W_2$ or $W=W_2 \otimes W_1$, where $W_1$ is a first precoding submatrix, $W_2$ is a second precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2; and a sending unit, configured to send a precoding matrix indicator (PMI) corresponding to the precoding matrix to the base station, where the precoding matrix is determined by the determining unit.

In a first possible implementation manner of the third aspect, the determining unit being configured to determine a precoding matrix from a precoding matrix set includes: determining the first precoding submatrix and the second precoding submatrix from the precoding matrix set; and determining the precoding matrix according to the first precoding submatrix and the second precoding submatrix.

With reference to the third aspect or the first possible implementation manner of the third aspect, in a second possible implementation manner, the first precoding submatrix is a precoding submatrix in a first direction, and the second precoding submatrix is a precoding submatrix in a second direction, or the first precoding submatrix is a precoding submatrix in a second direction and the second precoding submatrix is a precoding submatrix in a first direction.

With reference to the second possible implementation manner of the third aspect, in a third possible implementation manner, a configuration manner of the 16 antenna ports includes any one of the following:

two antenna ports are configured in the first direction and eight antenna ports are configured in the second direction;

four antenna ports are configured in the first direction and four antenna ports are configured in the second direction;

eight antenna ports are configured in the first direction and two antenna ports are configured in the second direction; or 16 antenna ports are configured in the first direction and one antenna port is configured in the second direction.

With reference to the third possible implementation manner of the third aspect, in a fourth possible implementation manner, a precoding matrix in the first direction is a precoding matrix in a horizontal direction, and a precoding matrix in the second direction is a precoding matrix in a vertical direction, or a precoding matrix in the first direction is a precoding matrix in a vertical direction, and a precoding matrix in the second direction is a precoding matrix in a horizontal direction.

With reference to any one of the third aspect or the first to the fourth possible implementation manners of the third aspect, in a fifth possible implementation manner, the first precoding submatrix is a product of a third precoding submatrix and a fourth precoding submatrix; and/or the second precoding submatrix is a product of a fifth precoding submatrix and a sixth precoding submatrix.

With reference to any one of the third aspect or the first to the fifth possible implementation manners of the third aspect, in a sixth possible implementation manner, the determining unit is further configured to: determine a bit quantity corresponding to a PMI of $W_1$ and a bit quantity corresponding to a PMI of $W_2$, and determine the PMI of $W_1$ and the PMI of $W_2$ according to the bit quantity corresponding to the PMI of $W_1$ and the bit quantity corresponding to the PMI of $W_2$.

With reference to the sixth possible implementation manner of the third aspect, in a seventh possible implementation manner, the determining unit is further configured to control the receiving unit to receive bit indication information sent by the base station, where the bit indication information is used to indicate at least one of the bit quantity corresponding to the PMI of $W_1$ or the bit quantity corresponding to the PMI of $W_2$.

According to a fourth aspect, an embodiment of the present disclosure provides a base station, including:

a sending unit, configured to send a reference signal to UE by using 16 antenna ports;

a receiving unit, configured to receive a precoding matrix indicator (PMI) fed back by the UE, where the PMI is determined according to the reference signal sent by the sending unit; and a determining unit, configured to determine a precoding matrix corresponding to the PMI received by the receiving unit from a precoding matrix set corresponding to the 16 antenna ports, where each precoding matrix W in the precoding matrix set satisfies the following relationship: $W=W_1 \otimes W_2$ or $W=W_2 \otimes W_1$, where $W_1$ is a first precoding submatrix, $W_2$ is a second precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2, where the sending unit is further configured to send data to the UE by using the precoding matrix determined by the determining unit.

In a first possible implementation manner of the fourth aspect, a quantity of PMIs is at least two; and the determining unit being configured to determine a precoding matrix from a precoding matrix set corresponding to the 16 antenna ports includes:

determining the first precoding submatrix and the second precoding submatrix according to a PMI of the first precoding submatrix and a PMI of the second precoding submatrix; and determining the precoding matrix according to the first precoding submatrix and the second precoding submatrix.

With reference to the fourth aspect or the first possible implementation manner of the fourth aspect, in a second possible implementation manner, the first precoding submatrix is a precoding submatrix in a first direction, and the second precoding submatrix is a precoding submatrix in a second direction, or the first precoding submatrix is a precoding submatrix in a second direction and the second precoding submatrix is a precoding submatrix in a first direction.

With reference to the second possible implementation manner of the fourth aspect, in a third possible implementation manner, a configuration manner of the 16 antenna ports includes any one of the following: two antenna ports are configured in the first direction and eight antenna ports are configured in the second direction; four antenna ports are configured in the first direction and four antenna ports are configured in the second direction; or eight antenna ports are configured in the first direction and two antenna ports are configured in the second direction; or 16 antenna ports are configured in the first direction and one antenna port is configured in the second direction.

With reference to the third possible implementation manner of the fourth aspect, in a fourth possible implementation manner, a precoding matrix in the first direction is a precoding matrix in a horizontal direction, and a precoding matrix in the second direction is a precoding matrix in a vertical direction, or a precoding matrix in the first direction is a precoding matrix in a vertical direction, and a precoding matrix in the second direction is a precoding matrix in a horizontal direction.

With reference to any one of the fourth aspect or the first to the fourth possible implementation manners of the fourth aspect, in a fifth possible implementation manner, the first precoding submatrix is a product of a third precoding submatrix and a fourth precoding submatrix; and/or the second precoding submatrix is a product of a fifth precoding submatrix and a sixth precoding submatrix.

With reference to any one of the fourth aspect or the first to the fifth possible implementation manners of the fourth aspect, in a sixth possible implementation manner, the determining unit is further configured to determine a bit quantity of a PMI of $W_1$ and a bit quantity of a PMI corresponding to $W_2$; and the receiving unit is further configured to receive, according to the bit quantity of the PMI corresponding to $W_1$ and the bit quantity of the PMI corresponding to $W_2$, the PMI of $W_1$ and the PMI of $W_2$ that are fed back by the UE.

With reference to the sixth possible implementation manner of the fourth aspect, in a seventh possible implementation manner, the determining unit is further configured to control the sending unit to send bit indication information to the UE, where the bit indication information is used to indicate at least one of the bit quantity corresponding to the PMI of $W_1$ or the bit quantity corresponding to the PMI of $W_2$.

By means of the foregoing solutions, in the embodiments of the present disclosure, if it is determined that a total quantity of antenna ports is fixed to 16, codebooks used in different antenna port configurations are changed, so as to achieve an effect of reducing storage resources and avoiding configuring multiple codebooks by adding signaling.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and a person of ordinary skill in the art may still derive other drawings from these accompanying drawings without creative efforts.

DETAILED DESCRIPTION

Usually, dimensions of A and B are determined by an antenna port quantity. In a process of selecting a codebook, a precoding matrix set needs to be further determined according to a distribution status of antenna ports. User equipment and a network device determine different codebook sets for different antenna port configuration manners. The UE or a base station needs to store various types of codebooks, causing waste of storage resources. On the other hand, if storage resources are fixed, when all the foregoing five codebooks are stored, the UE needs to configure, according to a case of insufficient measurement accuracy, for example, in a scenario of 16 antennas, a codebook set having five dimensions: 1, 2, 4, 8, and 16. In this case, the base station and/or the UE needs to store four types of codebooks. If accuracy is ensured, the UE or the base station needs to store various types of codebooks, causing waste of storage resources. On the other hand, if storage resources are fixed, when all the foregoing five codebooks are stored, measurement accuracy of the UE is insufficient.

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, the base station involved in the present disclosure may be, but is not limited to, a NodeB, a base station (BS), an access point, a transmission point (TP), an evolved NodeB (eNB), or a relay. The user equipment (UE) involved in the present disclosure may be, but is not limited to, a mobile station (MS), a relay, a mobile telephone, a handset, portable equipment, or a mobile or non-mobile terminal.

Figure 1:
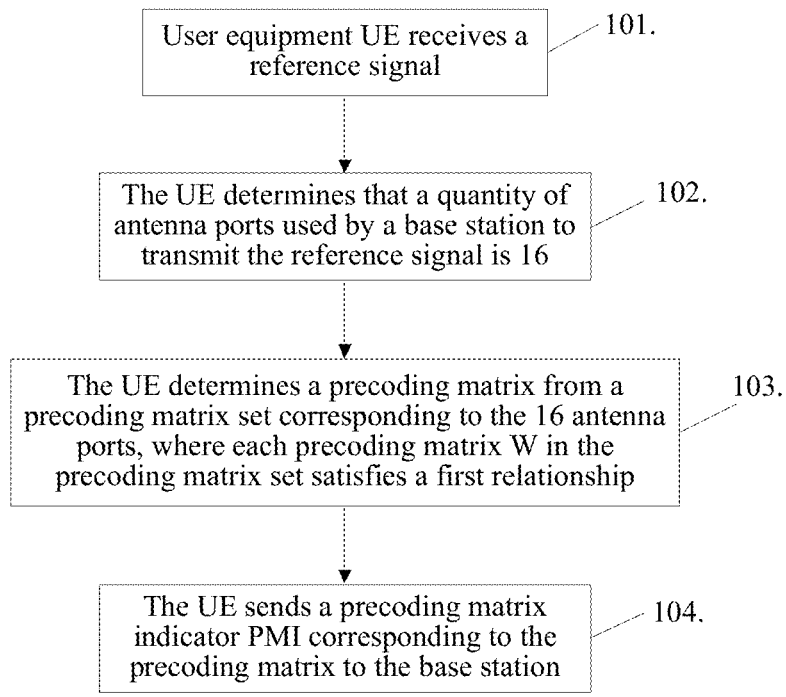
FIG. 1 is a flowchart of a PMI feedback method on a UE side according an embodiment of the present disclosure.

FIG. 1 is a schematic flowchart of a communication method according to an embodiment of the present disclosure, and relates to a precoding matrix indicator (PMI) feedback method. The method specifically includes the following steps.

Step 101. User equipment (UE) receives a reference signal.

Step 102. The UE determines that a quantity of antenna ports used by a base station to transmit the reference signal is 16.

Step 103. The UE determines a precoding matrix from a precoding matrix set corresponding to the 16 antenna ports, where each precoding matrix W in the precoding matrix set satisfies the following relationship: $W=W_1 \otimes W_2$ or $W=W_2 \otimes W_1$, where $W_1$ is a first precoding submatrix, $W_2$ is a second precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2.

For ease of description and illustration, the satisfied relationship: $W=W_1 \otimes W_2$ or $W=W_2 \otimes W_1$, is collectively referred to as a first relationship in this embodiment of the present disclosure.

Step 104. The UE sends a precoding matrix indicator (PMI) corresponding to the precoding matrix to the base station.

According to the embodiments shown in FIG. 1, in a configuration of 16 antenna ports, after performing measurement according to a reference signal to obtain a measurement result, user equipment determines, from only one codebook set, a first precoding matrix whose corresponding dimension is 2 and a second precoding matrix whose dimension is 8, thereby reducing storage resources and air interface configuration resources.

Figure 2:
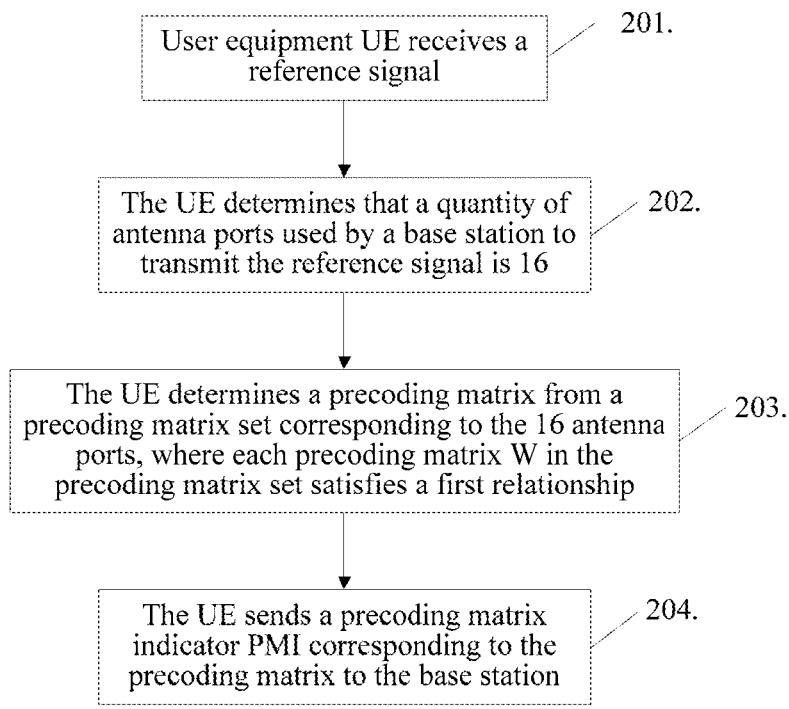
FIG. 2 is a flowchart of a PMI feedback method on a UE side according an embodiment of the present disclosure.

FIG. 2 is a schematic flowchart of a communication method according to an embodiment of the present disclosure, and relates to a precoding matrix indicator (PMI) feedback method. The method specifically includes the following steps.

Step 201. User equipment (UE) receives a reference signal.

Step 202. The UE determines that a quantity of antenna ports used by a base station to transmit the reference signal is 16.

It should be understood that, the present disclosure does not limit a specific method for determining, by the UE, that a quantity of antenna ports used by the base station to transmit the reference signal is 16. The method may be preconfigured by the UE, or may be determined by means of measurement. In an embodiment, the UE may determine the quantity of antenna ports according to the reference signal. Such a determining process may be an implicit determining method. For example, if the UE receives only 16 reference signals, the UE can determine that the quantity of antenna ports used by the base station to transmit the reference signal is 16. In another embodiment, the quantity of antenna ports used by the base station to transmit the reference signal may not be determined by the UE by using the reference signal, but is configured by using some signaling, or has been prestored in the UE by means of presetting or in another manner. In addition, in this case, step 202 may be performed before step 201 or step 202 and step 201 may be performed at the same time.

Step 203. The UE determines a precoding matrix from a precoding matrix set corresponding to the 16 antenna ports, where each precoding matrix W in the precoding matrix set satisfies the following relationship: $W=W_1 \otimes W_2$ or $W=W_2 \otimes W_1$, where $W_1$ is a first precoding submatrix, $W_2$ is a second precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2.

In an embodiment, the UE determines the first precoding submatrix and the second precoding submatrix from the precoding matrix set. The UE determines the precoding matrix according to the first precoding submatrix and the second precoding submatrix. It should be understood that, the precoding matrix set herein may further be an integration of multiple sets, or a precoding codebook set meeting a condition is determined from a set.

In a 3D MIMO scenario, the determined precoding matrix W is a Kronecker product of the first precoding matrix $W_1$ and the second precoding matrix $W_2$:

$$W=W_1 \otimes W_2.$$

According to a specific property of a Kronecker product, if $W_1$ is a matrix of m1 rows and m2 columns, and $W_2$ is a matrix of n1 rows and n2 columns, the finally determined matrix W is a matrix of m1×n1 rows and m2×n2 columns. In a 3D MIMO scenario with 16 antenna ports, a dimension of W should be 16, so that the base station precodes a signal that needs to be transmitted, and on the UE side, deprecoding is performed. Therefore, a value of m1×n1 or m2×n2 should be 16. The row quantity of the first precoding submatrix is 2, and the row quantity of the second precoding submatrix is 8. Alternatively, the column quantity of the first precoding submatrix is 8, and the column quantity of the second precoding submatrix is 2. It should be understood that, the present disclosure claims to protect all types of variations of the case in which $W=W_1 \otimes W_2$, for example, cases in which $W=W_1^T \otimes W_2^T$ or $W=W_1 \otimes W_2^T$ or $W=W_1 \otimes W_2$. For the case in which $W=W_1^T \otimes W_2^T$, as described above, dimensions of columns of two matrices are respectively 2 and 8, or dimensions of rows are respectively 2 and 8. One of dimensions of a finally determined precoding matrix W should be 16. In this way, W or a transpose of W may be used to perform precoding or deprecoding on a signal. For the cases in which $W=W_1 \otimes W_2^T$ and $W=W_1^T \otimes W_2$, the row quantity of the first precoding submatrix may be 2 and the column quantity of the second precoding submatrix may be 8; or the column quantity of the first precoding submatrix may be 8 and the row quantity of the second precoding submatrix may be 2. It should be understood that, the present disclosure does not limit in such a manner that another operation step is added after W is determined and before precoding or decoding of precoding is performed on a matrix. For example, vectors with a length of 16 are selected from W, to form another matrix W', and then W' is used for deprecoding. It should be understood that, formula variations that can represent ideas of the present disclosure all fall within the protection scope of the present disclosure.

It should be understood that, the precoding matrix set should be a final selection range. That is, if a set $\{W\}_A$ includes an element V that does not satisfy the relationship: $W = W_1 \otimes W_2$ or $W = W_2 \otimes W_1$, but in a process of finally determining a precoding matrix, V is excluded by using any other condition, the precoding matrix set may not be a final element of $\{W\}_A$. Therefore, for a set $\{W\}_A$ including an element V, if it is determined, through screening by using a condition, that only one of a row quantity or a column quantity of $\{W\}A'$ is 8 or 2, $\{W\}A$ falls within the protection scope of the present disclosure. For example, a set $\{W\}_B$ includes an element $V_1$, and a row quantity or a column quantity of $V_1$ is neither 2 nor 8. If it cannot be determined that $V_1$ is either $W_1$ or $W_2$ in any case, $\{W\}_B$ is not the precoding matrix, but $\{W\}_{B'}$ is the precoding matrix. Any element in $\{W\}_{B'}$ may be determined, by means of measurement, as $W_1$ or $W_2$. This also falls within the protection scope of the present disclosure.

In still another embodiment, the first precoding submatrix is a precoding submatrix in a first direction, and the second precoding submatrix is a precoding submatrix in a second direction, or the first precoding submatrix is a precoding submatrix in a second direction and the second precoding submatrix is a precoding submatrix in a first direction.

Figure 2A:
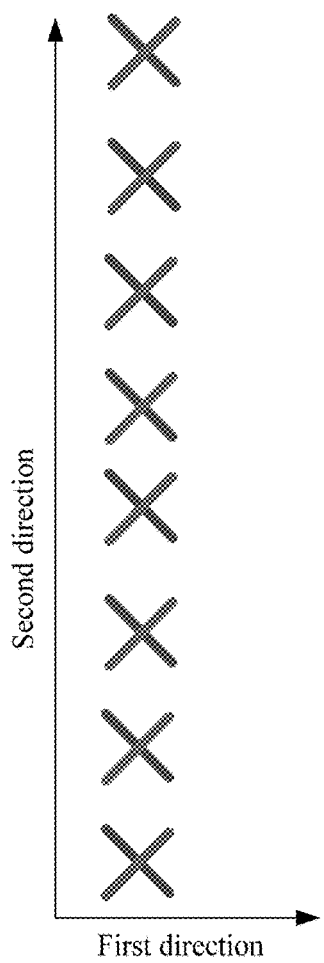
FIG. 2a is a structural diagram of an antenna port configuration according an embodiment of the present disclosure.
Figure 2B:
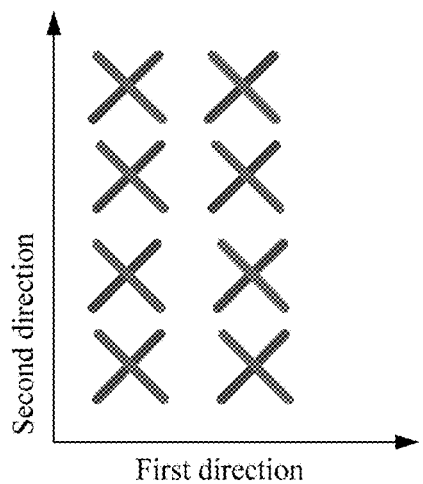
FIG. 2b is a structural diagram of an antenna port configuration according an embodiment of the present disclosure.
Figure 2C:
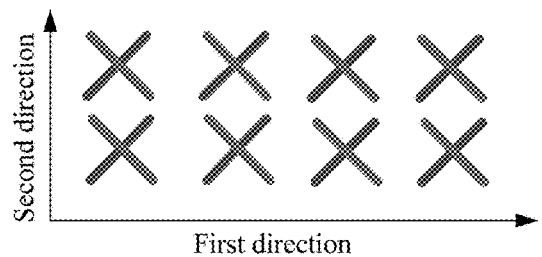
FIG. 2c is a structural diagram of an antenna port configuration according an embodiment of the present disclosure.
Figure 2D:
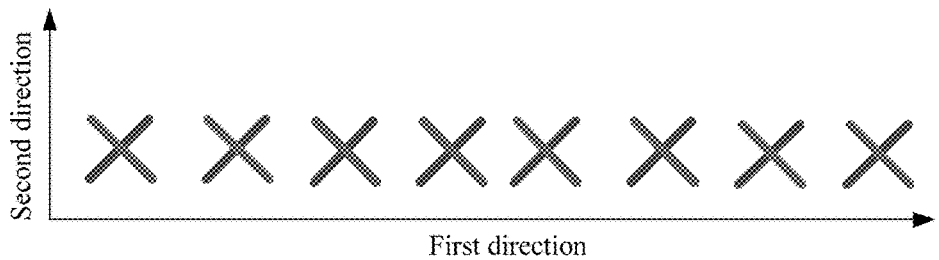
FIG. 2d is a structural diagram of an antenna port configuration according an embodiment of the present disclosure.

One precoding matrix may include two precoding submatrices. For example, the two submatrices may be the first precoding submatrix and the second precoding submatrix. In addition, the precoding matrix may be formed in a manner of a product, or in a manner corresponding to an antenna port precoding matrix model of the precoding matrix, for example, in a form of a Kronecker product. The precoding submatrix may have different physical meanings. Sizes of codebooks having different dimensions may be determined according to the physical meanings of the precoding submatrix. For example, for 3D MIMO, each precoding matrix may correspond to two arrangement directions of antenna ports, where either direction may correspond to one precoding submatrix. In a scenario with 16 antenna ports, antenna ports may be configured in different manners according to different directions. In other words, for different arrangement manners, each configuration manner may be considered as a configuration. FIG. 2a, FIG. 2b, FIG. 2c, and FIG. 2d show basic manners of configuring 16 antenna ports. In FIG. 2a, two antenna ports are configured in the first direction and eight antenna ports are configured in the second direction. In FIG. 2b, four antenna ports are configured in the first direction and four antenna ports are configured in the second direction. In FIG. 2c, eight antenna ports are configured in the first direction and two antenna ports are configured in the second direction. In FIG. 2d, 16 antenna ports are configured in the first direction and one antenna port is configured in the second direction.

That is, the 16 antenna ports are configured in any one of the following manners:

two antenna ports are configured in the first direction and eight antenna ports are configured in the second direction;

four antenna ports are configured in the first direction and four antenna ports are configured in the second direction;

eight antenna ports are configured in the first direction and two antenna ports are configured in the second direction; or 16 antenna ports are configured in the first direction and one antenna port is configured in the second direction.

In the 3D MIMO scenario, the precoding matrix may be determined by using a precoding matrix in the first direction and a precoding matrix in the second direction. The precoding matrix in the first direction corresponds to a first antenna port configuration direction. The precoding matrix in the second direction corresponds to a second antenna port configuration direction. The first antenna port configuration direction and the second antenna port configuration direction may be physically actual configuration directions. Alternatively, in a dual-polarized antenna port of 45°, an angle may be considered as one of a vertical or horizontal configuration direction, and the other angle is considered as the other one of the vertical or horizontal configuration direction. The first precoding matrix and the second precoding matrix may be separately precoding matrices in different directions. For example, the precoding matrix in the first direction corresponds to the first direction, and the precoding matrix in the second direction corresponds to the second direction.

Generally, there are four different antenna port configurations for the 16 antenna ports. However, first precoding matrices or second precoding matrices having a same dimension may be determined for the four configurations according to an antenna port configuration direction.

In an embodiment, a precoding matrix in the first direction is a precoding matrix in a horizontal direction, and a precoding matrix in the second direction is a precoding matrix in a vertical direction, or a precoding matrix in the first direction is a precoding matrix in a vertical direction, and a precoding matrix in the second direction is a precoding matrix in a horizontal direction. According to a division manner for the vertical direction and the horizontal direction, more targeted selection may be performed for the antenna port configuration according to user distribution in an actual high-building scenario or a plain scenario. For example, if there are relatively more users in the vertical direction, more antenna ports in the vertical direction may be configured.

In an embodiment, a matrix model $W = W_1 \otimes W_2$ described in the present disclosure may further be decomposed. That is, the precoding matrix satisfies:

$$W = (W_3 \times W_4) \otimes W_2.$$

$W_1 = W_3 \otimes W_4$, where $W_3 \times W_4$ is a matrix whose row quantity is 2 and $W_2$ is a matrix whose row quantity is 8, or $W_3 \times W_4$ is a matrix whose column quantity is 2 and $W_2$ is a matrix whose column quantity is 8. Certainly, dimensions of $W_3 \times W_4$ and $W_2$ herein may further be exchanged. For example, $W_3 \times W_4$ is a matrix whose row quantity is 8 and $W_2$ is a matrix whose row quantity is 2, or $W_3 \times W_4$ is a matrix whose column quantity is 8 and $W_2$ is a matrix whose column quantity is 2. That is, the first precoding submatrix is a product of a third precoding submatrix and a fourth precoding submatrix, and/or the second precoding submatrix is a product of a fifth precoding submatrix and a sixth precoding submatrix. $W_3$ and $W_4$ may be two submatrices forming the precoding matrix in the first direction, or $W_4$ may be considered as a weighted matrix of $W_3$. A specific weighting manner may be the same of a non-3D MIMO determining manner. For example, $W_3$ may be used as a long-term wideband-featured matrix, representing a long-term wideband feature of the antenna port in the first direction. $W_4$ may be used as a short-term narrowband-featured matrix, representing a short-term narrowband feature of the antenna port in the first direction. It should be understood that, because one dimension of the first precoding submatrix may be 2, and one dimension of the second precoding submatrix may be 8, when a dimension of $W_2$ is either 8 or 2, a product of $W_3$ and $W_4$ should have a dimension being the other one of 8 or 2. In addition, the present disclosure claims to protect another implementation manner similar to this, for example:

in a form that $W=W_1 \otimes (W_5 \times W_6)$, where $W_2=W_5 \otimes W_6$, or in a form that $W=(W_3 \times W_4) \otimes (W_5 \times W_6)$, and when at least one of the first precoding submatrix or the second precoding submatrix may be indicated in a form of a product of another two matrices, there may be more than two PMIs that need to be fed back. For example, for a form that $W=(W_3 \times W_4) \otimes W_2$, a PMI of $W_3$, a PMI of $W_4$, and a PMI of $W_2$ may be fed back. Some cases in such a form are shown by using examples below: $W_2$ is a matrix whose row quantity is 8, and a row quantity of $W_3$ is 2; or a column quantity of $W_2$ is 8, and a column quantity of $W_4$ is 2; or $W_2$ is a matrix whose row quantity is 2, and a row quantity of $W_3$ is 8; or a column quantity of $W_2$ is 2, and a column quantity of $W_4$ is 8.

It should be understood that, such a form is also applicable to $W=W_1 \otimes (W_5 \times W_6)$: a row quantity of $W_1$ is 8, and a row quantity of $W_5$ is 2; or a column quantity of $W_1$ is 8, and a column quantity of $W_6$ is 2; or a row quantity of $W_1$ is 2, and a row quantity of $W_5$ is 8; or a column quantity of $W_1$ is 2, and a column quantity of $W_6$ is 8.

Similarly, in a form that $W=(W_3 \times W_4) \otimes (W_5 \times W_6)$, a row quantity of $W_3$ is 8, and a row quantity of $W_5$ is 2; or a column quantity of $W_4$ is 8, and a column quantity of $W_6$ is 2; or a row quantity of $W_3$ is 2, and a row quantity of $W_5$ is 8; or a column quantity of $W_4$ is 2, and a column quantity of $W_6$ is 8.

It should be understood that, in this embodiment of the present disclosure, a first precoding matrix whose corresponding dimension is 2 and a second precoding matrix whose dimension is 8 are determined from only one codebook set. Alternatively, there may be two codebook sets, in one codebook set, dimensions are all 2, and in the other codebook set, dimensions are all 8. Alternatively, there are multiple codebook sets, and in the multiple codebook sets, elements are all elements being 2 or 8, but it is finally determined that the dimension of the first precoding matrix is 2 and the dimension of the second precoding matrix is 8. Considering a special case, if matrices in a codebook set include codebooks of other dimensions, these codebooks should not fall within a finally determined range. Optionally, elements in one codebook set are put together to obtain the first precoding matrix or the second precoding matrix, but it is finally determined that dimensions of the first precoding matrix and the second precoding matrix that form the precoding matrix are respectively 2 and 8.

Step 204. The UE sends a precoding matrix indicator (PMI) corresponding to the precoding matrix to the base station. The PMI is used to indicate the precoding matrix.

It should be understood that, the present disclosure does not limit a manner of feeding back the PMI. The PMI may be a field in a piece of signaling, or may be a piece of signaling. In an embodiment, in a case in which multiple precoding matrices need to be indicated, there may be multiple PMIs. Alternatively, there may be one PMI, but different parts of the PMI indicate different precoding matrices. For example, in a PMI of eight bits, the first three bits are used to indicate the PMI of the first precoding matrix, and the last five bits are used to indicate the PMI of the second precoding matrix. It should be understood that, in the embodiments of the present disclosure, in terms of a PMI corresponding to a matrix, the matrix may correspond to one field of the PMI, or the matrix may correspond to a single PMI.

Optionally, the UE determines a bit quantity corresponding to a PMI of $W_1$ and a bit quantity corresponding to a PMI of $W_2$. The UE determines the PMI of $W_1$ and the PMI of $W_2$ according to the bit quantity corresponding to the PMI of $W_1$ and the bit quantity corresponding to the PMI of $W_2$. The UE sends the PMI of $W_1$ and the PMI of $W_2$ to the base station. In a case in which feedback resources of a PMI are fixed, bits of the PMI are flexibly configured, so that a quantity of elements in a precoding submatrix set can be increased.

In a 3D MIMO scenario with 16 antenna ports, antenna ports can be extended in different directions because of different configuration manners of the antenna ports. In this embodiment, different antenna port counting manners are determined in different configurations, so that in all the different configurations, a matrix whose dimension is 8 and a matrix whose dimension is 2 are determined in a precoding codebook, and a value of the PMI is fed back to indicate a precoding matrix, thereby achieving an effect of reducing configuration signaling and saving air interface resources.

Because in this embodiment of the present disclosure, in a case of 16 antenna ports, a precoding submatrix whose dimension is 8 and a precoding submatrix whose dimension is 2 in a codebook are used, in addition to a counting effect that can be achieved in the foregoing embodiments, a quantity of precoding submatrices in the codebook can also be increased by using the saved resources, thereby more accurately meeting an accuracy requirement of a precoding matrix.

The following describes still another embodiment of the present disclosure, where in a case in which feedback resources of a PMI are fixed, bits of the PMI are flexibly configured, so that a quantity of elements in a precoding submatrix set can be increased.

Figure 3:
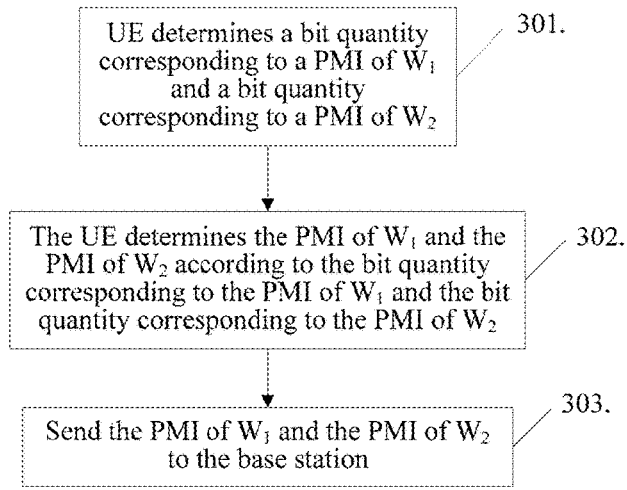
FIG. 3 is a flowchart of a PMI feedback method on a UE side according an embodiment of the present disclosure.

FIG. 3 shows a PMI feedback method. It should be understood that, this embodiment may be applied to other embodiments of the present disclosure. For example, this embodiment may be used as a more specific implementation manner of step 105 or step 205, or may be implemented as a single embodiment.

Step 301. The UE determines a bit quantity corresponding to a PMI of $W_1$ and a bit quantity corresponding to a PMI of $W_2$.

In an embodiment, the determining process may be a process of receiving signaling or an instruction, or a process of determining according to a reference signal, or a process of presetting, or a process of determining according to some other properties.

Step 302. The UE determines the PMI of $W_1$ and the PMI of $W_2$ according to the bit quantity corresponding to the PMI of $W_1$ and the bit quantity corresponding to the PMI of $W_2$.

Step 301 and step 302 may be performed according to the following examples.

The UE determines bit quantities corresponding to PMIs in a precoding matrix that need to be fed back. The UE determines, according to the precoding matrix, the fed back PMIs.

For example, the codebook includes multiple precoding submatrices, where a dimension of some precoding submatrices is 2, and a dimension of some other precoding submatrices is 8. Some submatrices whose dimension is 2 are used as an example.

| Value (three bits) of PMI | Value (two bits) of PMI | Corresponding precoding matrix (vector) |
| --- | --- | --- |
| 000 | 00 | A1 |
| 001 | — | A2 |
| 010 | 01 | A3 |
| 011 | — | A4 |
| 100 | 10 | A5 |
| 101 | — | A6 |
| 110 | 11 | A7 |
| 111 | — | A8 |

If there are eight matrices (A1 to A8) whose dimensions are 2 in a codebook set, when the UE determines that eight bits in a precoding matrix can be used in total, and three bits of the eight bits are used to indicate a matrix whose dimension is 2, it indicates that sufficient bits are allocated to the UE, or the UE determines that the UE has sufficient bits, to select, from the eight codebooks A1 to A8, a precoding submatrix (where the precoding submatrix may correspond to the first precoding submatrix in the embodiments shown in FIG. 1 and FIG. 2) corresponding to the measurement result. However, when the UE determines that eight bits in the precoding matrix can be used in total, and only two bits of the eight bits are used to indicate a matrix whose dimension is 2, the UE can indicate only one of four candidate matrices. In this case, feedback may be performed according to a preset rule, for example, it is determined that 00, 01, 10, and 11 respectively correspond to A1, A3, A5, and A7. In such a manner, accuracy is affected, but air interface bit resources are saved. In some cases, for example, when a precoding submatrix whose dimension is 2 does not need an extremely accurate indication, but a precoding submatrix whose dimension is 8 needs a relatively accurate indication, a degree of accuracy of the precoding submatrix whose dimension is 8 can be improved by reducing a quantity of bits occupied by a PMI of the precoding submatrix whose dimension is 2. Similarly, when a precoding submatrix whose dimension is 8 does not need an extremely accurate indication, but a precoding submatrix whose dimension is 2 needs a relatively accurate indication, a degree of accuracy of the precoding submatrix whose dimension is 2 can be improved by reducing a quantity of bits occupied by a PMI of the precoding submatrix whose dimension is 8. Currently, because distribution of user equipments differs in different scenarios, for example, in a high-building scenario, there are relatively more users distributed in a vertical direction, in a process of measuring and feeding back a PMI, if more precoding matrices that are more accurate can be provided, a determined precoding matrix can more accurately reflect a channel feature, thereby achieving an objective of improving signal strength. Therefore, more bit values need to be used to determine PMI feedback of the precoding submatrix whose dimension is 2. In a scenario of a broad plain, more dimension bit values need to be used to determine PMI feedback of the precoding submatrix whose dimension is 8. It should be understood that, an order of step 301 and step 302 may be reversed. The UE may first determine PMIs that need to be fed back, and then adjust accuracy after determining bit quantities of the fed back PMIs. For example, it is determined that a PMI that needs to be fed back is 001, but accuracy of a precoding submatrix in the direction is lower than accuracy of a submatrix in another direction. It may be determined, according to a preset rule, that 00 needs to be fed back as a PMI in the direction, and A1 is used as a precoding matrix in the direction, where A1 and A2 should relatively approximately reflect channel features. In addition, the bit quantity of the PMI of $W_1$ and the bit quantity of the PMI corresponding to $W_2$ may be bit quantities of respective PMIs of $W_1$ and $W_2$. If $W_1$ and $W_2$ are in different fields of a same PMI, such bit quantity refers to a case of bit allocation in the field to $W_1$ and $W_2$. When more than two matrices need to be indicated by PMIs, for example, in another embodiment, if it may be further determined that $W_1$ is represented by another two matrices, or it may be further determined that $W_2$ is represented by another two matrices, the UE may determine quantities of bits occupied by PMIs corresponding to multiple matrices.

It should be understood that, in the present disclosure, the bit quantity being 8 and the corresponding table are merely an example. The present disclosure further claims to protect feedback of different bit quantities and a technical solution of adjustment according to bit quantities that includes a form of a table and another type, for example, a mapping type or a formula type of precoding matrix determining manner.

Optionally, the determining, by the UE, bit quantities corresponding to PMIs in a precoding matrix that need to be fed back specifically includes: receiving a bit indication information sent by a base station, where the bit indication information is used to indicate the bit quantities corresponding to the PMIs that need to be fed back; or determining, by the UE according to the measurement, the bit quantities corresponding to the PMIs that need to be fed back, where in an embodiment, the UE sends, to the base station, the bit quantities corresponding to the PMIs that need to be fed back, and sending the bit quantities corresponding to the PMIs to the base station.

Optionally, the UE may further receive a piece of scenario information. The scenario information is used to indicate configurations, in different directions, of the UE that correspond to current communication between the UE and the base station. Herein, the different directions may be the first direction and the second direction, and may be specifically a horizontal direction and a vertical direction respectively.

Step 303. Send the PMI of $W_1$ and the PMI of $W_2$ to the base station.

According to the embodiment shown in FIG. 3, UE determines the bit quantities corresponding to PMIs that need to be fed back, and determines the fed back PMIs according to a precoding matrix and the bit quantities corresponding to the PMIs. The technical solution of this embodiment of the present disclosure can flexibly adjust granularities of fed back bits of the PMIs, so that on same feedback resources, a degree of beam accuracy in a direction is flexibly set, thereby achieving an objective of meeting requirements of various scenarios.

Figure 4:
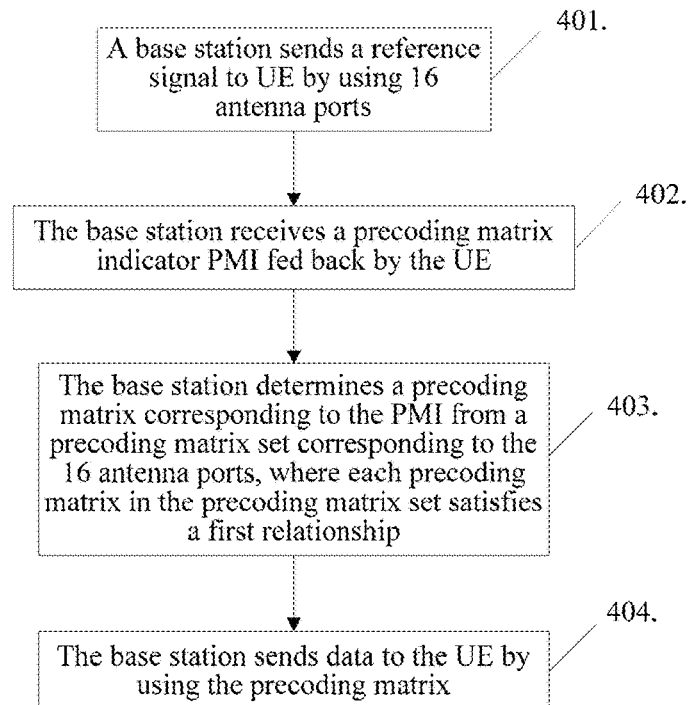
FIG. 4 is a flowchart of a PMI feedback method on a base station side according an embodiment of the present disclosure.

FIG. 4 is a schematic flowchart of a communication method according to an embodiment of the present disclosure, and relates to a precoding matrix indicator (PMI) feedback method. The method specifically includes the following steps.

Step 401. A base station sends a reference signal to UE by using 16 antenna ports.

Step 402. The base station receives a precoding matrix indicator (PMI) fed back by the UE.

Step 403. The base station determines a precoding matrix corresponding to the PMI from a precoding matrix set corresponding to the 16 antenna ports, where each precoding matrix W in the precoding matrix set satisfies the following relationship: $W = W_1 \otimes W_2$ or $W = W_2 \otimes W_1$, wherein $W_1$ is a first precoding submatrix, $W_2$ is a second precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2.

Step 404. The base station sends data to the UE by using the precoding matrix.

According to the embodiment shown in FIG. 4, in a configuration of 16 antenna ports, after performing measurement by sending a reference signal, to obtain a measurement result, a base station determines, from only one codebook set, a first precoding matrix whose corresponding dimension is 2 and a second precoding matrix whose dimension is 8, thereby reducing storage resources and air interface configuration resources.

Figure 5:
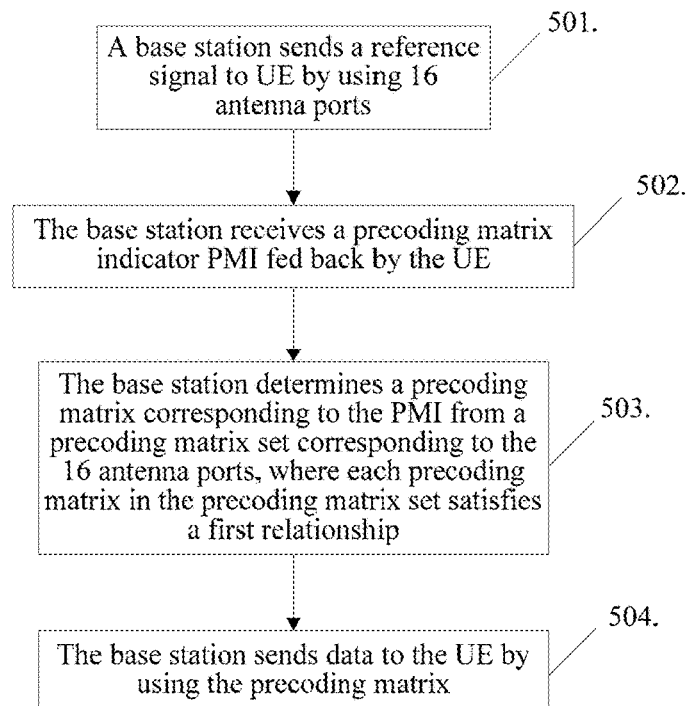
FIG. 5 is a flowchart of a PMI feedback method on a base station side according an embodiment of the present disclosure.

FIG. 5 is a schematic flowchart of a communication method according to an embodiment of the present disclosure, and relates to a precoding matrix indicator (PMI) feedback method. The method specifically includes the following steps.

Step 501. A base station sends a reference signal to UE by using 16 antenna ports.

In an embodiment, before step 501, the base station may first determine to use the scenario with 16 antenna ports.

In another embodiment, the base station further indicates, to the UE, that a quantity of the antenna ports is 16. For such an indication process, indication may be directly performed by using a piece of signaling, or indication to the UE may be performed in the process of sending a reference signal in step 501, or indication may be performed in the process of configuring the UE before step 501.

Step 502. The base station receives a precoding matrix indicator (PMI) fed back by the UE.

It should be understood that, the present disclosure does not limit a manner of feeding back the PMI. The PMI may be a field in a piece of signaling, or may be a piece of signaling. In an embodiment, if multiple precoding submatrices need to be indicated, there may be multiple PMIs. Alternatively, there may be one PMI, but different parts of the PMI indicate different precoding submatrices. These precoding submatrices form the precoding matrix according to a preset rule. The preset rule may be in a form of a product or a Kronecker product. For example, in a PMI of eight bits, the first three bits are used to indicate the PMI of the first precoding matrix, and the last five bits are used to indicate the PMI of the second precoding matrix. The first precoding matrix and the second precoding matrix are both precoding submatrices. It should be understood that, in the embodiments of the present disclosure, in terms of a PMI corresponding to a matrix, the matrix may correspond to one field of the PMI, or the matrix may correspond to a single PMI.

Optionally, before the base station receives the precoding matrix indicator (PMI) fed back by the UE, the base station determines a bit quantity of a PMI of $W_1$ and a bit quantity of a PMI corresponding to $W_2$. The base station receives, according to the bit quantity of the PMI of $W_1$ and the bit quantity of the PMI corresponding to $W_2$, at least two PMIs fed back by the UE. This step may further be performed before the base station sends the reference signal to the UE by using the 16 antenna ports.

If feedback resources of a PMI are fixed, bits of the PMI are flexibly configured, so that a quantity of elements in a precoding submatrix set can be increased.

Step 503. The base station determines a precoding matrix corresponding to the PMI from a precoding matrix set corresponding to the 16 antenna ports, where each precoding matrix W in the precoding matrix set satisfies the following relationship: $W = W_1 \otimes W_2$ or $W = W_2 \otimes W_1$, wherein $W_1$ is a first precoding submatrix, $W_2$ is a second precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2.

Step 504. The base station sends data to the UE by using the precoding matrix.

For example, a quantity of PMIs is at least two. The determining, by the base station, a precoding matrix corresponding to the at least two PMIs from a precoding matrix set corresponding to the 16 antenna ports includes: determining, by the base station, the first precoding submatrix and the second precoding submatrix according to a PMI of the first precoding submatrix and a PMI of the second precoding submatrix; and determining, by the base station, the precoding matrix according to the first precoding submatrix and the second precoding submatrix. It should be understood that, the precoding matrix set herein may further be an integration of multiple sets, or a precoding codebook set meeting a condition is determined from a set.

In a 3D MIMO scenario, the determined precoding matrix W is a Kronecker product of the first precoding matrix $W_1$ and the second precoding matrix $W_2$:

$$W = W_1 \otimes W_2.$$

According to a specific property of a Kronecker product, if $W_1$ is a matrix of m1 rows and m2 columns, and $W_2$ is a matrix of n1 rows and n2 columns, the finally determined matrix W is a matrix of m1×n1 rows and m2×n2 columns. In a 3D MIMO scenario with 16 antenna ports, a dimension of W should be 16, so that the base station precodes a signal that needs to be transmitted, and on the UE side, deprecoding is performed. In the embodiments of the present disclosure, deprecoding herein may also be referred to as decoding of precoding. Therefore, a value of m1×n1 or m2×n2 should be 16. The row quantity of the first precoding submatrix is 2, and the row quantity of the second precoding submatrix is 8. Alternatively, the column quantity of the first precoding submatrix is 8, and the column quantity of the second precoding submatrix is 2. It should be understood that, the present disclosure claims to protect all types of variations of the case in which $W = W_1 \otimes W_2$ or the case in which $W = W_2 \otimes W_1$, for example, cases in which $W = W_1^T \otimes W_2^T$ or $W = W_1 \otimes W_2^T$ or $W = W_1^T \otimes W_2$. For the case in which $W = W_1^T \otimes W_2^T$, as described above, dimensions of columns of two matrices are respectively 2 and 8, or dimensions of rows are respectively 2 and 8. One of dimensions of a finally determined precoding matrix W should be 16. In this way, W or a transpose of W may be used to perform precoding on a signal. For the cases in which $W = W_1^T \otimes W_2^T$ and $W = W_1^T \otimes W_2$, the row quantity of the first precoding submatrix may be 2 and the column quantity of the second precoding submatrix may be 8; or the column quantity of the first precoding submatrix may be 8 and the row quantity of the second precoding submatrix may be 2. It should be understood that, the present disclosure does not limit in such a manner that another operation step is added after W is determined and before precoding is performed on a matrix. For example, vectors with a length of 16 are selected from W, to form another matrix W', and then W' is used for precoding. It should be understood that, formula variations that can represent ideas of the present disclosure all fall within the protection scope of the present disclosure.

It should be understood that, the precoding matrix set should be a final selection range. That is, if a set $\{W\}_A$ includes an element V that does not satisfy the relationship: $W=W_1 \otimes W_2$ or $W=W_2 \otimes W_1$, but in a process of finally determining a precoding matrix, V is excluded by using any other condition, the precoding matrix set may not be a final element of $\{W\}_A$. Therefore, for a set $\{W\}_A$ including an element V, if it is determined, through screening by using a condition, that only one of a row quantity or a column quantity of $\{W\}A'$ is 8 or 2, $\{W\}_A$ falls within the protection scope of the present disclosure. For example, a set $\{W\}_B$ includes an element $V_1$, and a row quantity or a column quantity of $V_1$ is neither 2 nor 8. If it cannot be determined that $V_1$ is either $W_1$ or $W_2$ in any case, $\{W\}_B$ is not the precoding matrix, but $\{W\}_{B'}$ is the precoding matrix. Any element in $\{W\}_{B'}$ may be determined, by means of measurement, as $W_1$ or $W_2$. This also falls within the protection scope of the present disclosure.

In still another embodiment, the first precoding submatrix is a precoding submatrix in a first direction, and the second precoding submatrix is a precoding submatrix in a second direction, or the first precoding submatrix is a precoding submatrix in a second direction and the second precoding submatrix is a precoding submatrix in a first direction.

One precoding matrix may include two precoding submatrices. For example, the two submatrices may be the first precoding submatrix and the second precoding submatrix. In addition, the precoding matrix may be formed in a manner of a product, or in a manner corresponding to an antenna port precoding matrix model of the precoding matrix, for example, in a form of a Kronecker product. The precoding submatrix may have different physical meanings. Sizes of codebooks having different dimensions may be determined according to the physical meanings of the precoding submatrix. For example, for 3D MIMO, each precoding matrix may correspond to two arrangement directions of antenna ports, where either direction may correspond to one precoding submatrix. In a scenario with 16 antenna ports, antenna ports may be configured in different manners according to different directions. In other words, for different arrangement manners, each configuration manner may be considered as a configuration. Refer to the basic manners of configuring 16 antenna ports shown in FIG. 2a, FIG. 2b, FIG. 2c, and FIG. 2d. Detailed descriptions have been provided in the embodiment shown in FIG. 2, and the descriptions are not repeated herein any further.

That is, the 16 antenna ports are configured in any one of the following manners:

two antenna ports are configured in the first direction and eight antenna ports are configured in the second direction;

four antenna ports are configured in the first direction and four antenna ports are configured in the second direction;

eight antenna ports are configured in the first direction and two antenna ports are configured in the second direction; or 16 antenna ports are configured in the first direction and one antenna port is configured in the second direction.

In the 3D MIMO scenario, the precoding matrix may be determined by using a precoding matrix in the first direction and a precoding matrix in the second direction. The precoding matrix in the first direction corresponds to a first antenna port configuration direction. The precoding matrix in the second direction corresponds to a second antenna port configuration direction. The first antenna port configuration direction and the second antenna port configuration direction may be physically actual configuration directions. Alternatively, in a dual-polarized antenna port of 45°, an angle may be considered as one of a vertical or horizontal configuration direction, and the other angle is considered as the other one of the vertical or horizontal configuration direction. The first precoding matrix and the second precoding matrix may be separately precoding matrices in different directions. For example, the precoding matrix in the first direction corresponds to the first direction, and the precoding matrix in the second direction corresponds to the second direction.

Generally, there are four different antenna port configurations for the 16 antenna ports. However, first precoding matrices or second precoding matrices having a same dimension may be determined for the four configurations according to an antenna port configuration direction.

In an embodiment, a precoding matrix in the first direction is a precoding matrix in a horizontal direction, and a precoding matrix in the second direction is a precoding matrix in a vertical direction, or a precoding matrix in the first direction is a precoding matrix in a vertical direction, and a precoding matrix in the second direction is a precoding matrix in a horizontal direction. According to a division manner for the vertical direction and the horizontal direction, more targeted selection may be performed for the antenna port configuration according to user distribution in an actual high-building scenario or a plain scenario. For example, if there are relatively more users in the vertical direction, more antenna ports in the vertical direction may be configured.

In an embodiment, a matrix model $W=W_1 \otimes W_2$ described in the present disclosure may further be decomposed. That is, the precoding matrix satisfies:

$$W=(W_3 \times W_4) \otimes W_2.$$

$W_1=W_3 \otimes W_4$, where $W_3 \times W_4$ is a matrix whose row quantity is 2 and $W_2$ is a matrix whose row quantity is 8, or $W_3 \times W_4$ is a matrix whose column quantity is 2 and $W_2$ is a matrix whose column quantity is 8. Certainly, dimensions of $W_3 \times W_4$ and $W_2$ herein may further be exchanged. For example, $W_3 \times W_4$ is a matrix whose row quantity is 8 and $W_2$ is a matrix whose row quantity is 2, or $W_3 \times W_4$ is a matrix whose column quantity is 8 and $W_2$ is a matrix whose column quantity is 2. That is, the first precoding submatrix is a product of a third precoding submatrix and a fourth precoding submatrix, and/or the second precoding submatrix is a product of a fifth precoding submatrix and a sixth precoding submatrix. $W_3$ and $W_4$ may be two submatrices forming the precoding matrix in the first direction, or $W_4$ may be considered as a weighted matrix of $W_3$. A specific weighting manner may be the same of a non-3D MIMO determining manner. For example, $W_3$ may be used as a long-term wideband-featured matrix, representing a long-term wideband feature of the antenna port in the first direction. $W_4$ may be used as a short-term narrowband-featured matrix, representing a short-term narrowband feature of the antenna port in the first direction. It should be understood that, because one dimension of the first precoding submatrix may be 2, and one dimension of the second precoding submatrix may be 8, when a dimension of $W_2$ is either 8 or 2, a product of $W_3$ and $W_4$ should have a dimension being the other one of 8 or 2. In addition, the present disclosure claims to protect another implementation manner similar to this, for example:

in a form that $W=W_1 \otimes (W_5 \times W_6)$, where $W_2=W_5 \otimes W_6$, or in a form that $W=(W_3 \times W_4) \otimes (W_5 \times W_6)$, and when at least one of the first precoding submatrix or the second precoding submatrix may be indicated in a form of a product of another two matrices, there may be more than two PMIs that need to be fed back. For example, for a form that $W=(W_3 \times W_4) \otimes W_2$, a PMI of $W_3$, a PMI of $W_4$, and a PMI of $W_2$ that are fed back by the UE may be received. Some cases in such a form are shown by using examples below: $W_2$ is a matrix whose row quantity is 8, and a row quantity of $W_3$ is 2; or a column quantity of $W_2$ is 8, and a column quantity of $W_4$ is 2; or $W_2$ is a matrix whose row quantity is 2, and a row quantity of $W_3$ is 8; or a column quantity of $W_2$ is 2, and a column quantity of $W_4$ is 8.

It should be understood that, such a form is also applicable to $W=W_1 \otimes (W_5 \times W_6)$: a row quantity of $W_1$ is 8, and a row quantity of $W_5$ is 2; or a column quantity of $W_1$ is 8, and a column quantity of $W_6$ is 2; or a row quantity of $W_1$ is 2, and a row quantity of $W_5$ is 8; or a column quantity of $W_1$ is 2, and a column quantity of $W_6$ is 8.

Similarly, in a form that $W=(W_3 \times W_4) \otimes (W_5 \times W_6)$, a row quantity of $W_3$ is 8, and a row quantity of $W_5$ is 2; or a column quantity of $W_4$ is 8, and a column quantity of $W_6$ is 2; or a row quantity of $W_3$ is 2, and a row quantity of $W_5$ is 8; or a column quantity of $W_4$ is 2, and a column quantity of $W_6$ is 8.

It should be understood that, in this embodiment of the present disclosure, a first precoding matrix whose corresponding dimension is 2 and a second precoding matrix whose dimension is 8 are determined from only one codebook set. Alternatively, there may be two codebook sets, in one codebook set, dimensions are all 2, and in the other codebook set, dimensions are all 8. Alternatively, there are multiple codebook sets, and in the multiple codebook sets, elements are all elements being 2 or 8, but it is finally determined that the dimension of the first precoding matrix is 2 and the dimension of the second precoding matrix is 8. Considering a special case, if matrices in a codebook set include codebooks of other dimensions, these codebooks should not fall within a finally determined range. Optionally, elements in one codebook set are put together to obtain the first precoding matrix or the second precoding matrix, but it is finally determined that dimensions of the first precoding matrix and the second precoding matrix that form the precoding matrix are respectively 2 and 8.

Because in this embodiment of the present disclosure, in a case of 16 antenna ports, a precoding submatrix whose dimension is 8 and a precoding submatrix whose dimension is 2 in a codebook are used, in addition to a counting effect that can be achieved in the foregoing embodiments, a quantity of precoding submatrices in the codebook can also be increased by using the reduced resources, thereby more accurately meeting an accuracy requirement of a precoding matrix.

The following describes still another embodiment of the present disclosure, where if feedback resources of a PMI are fixed, bits of the PMI are flexibly configured, so that a quantity of elements in a precoding submatrix set can be increased.

Figure 6:
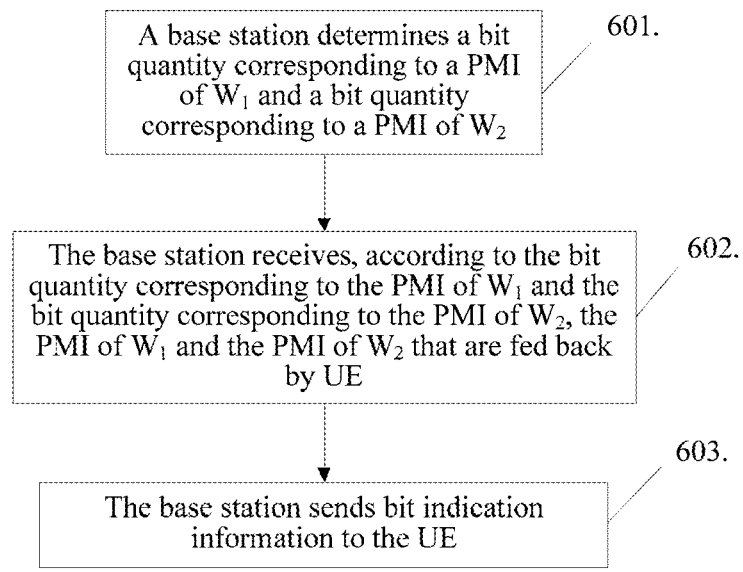
FIG. 6 is a flowchart of a PMI feedback method on a base station side according an embodiment of the present disclosure.

FIG. 6 shows a precoding matrix determining method. It should be understood that, this embodiment may be applied to other embodiments of the present disclosure. For example, this embodiment may be used as a more specific implementation manner of step 405 or step 505, or may be implemented as a single embodiment.

Step 601. A base station determines a bit quantity corresponding to a PMI of $W_1$ and a bit quantity corresponding to a PMI of $W_2$.

In an embodiment, the determining process may be a process of receiving signaling or an instruction of another network device, for example, a network element of a core network, or another base station, or a process of determining according to a channel feature, or a process of presetting, or a process of determining according to some other properties.

Step 602. The base station receives, according to the bit quantity of the PMI corresponding to $W_1$ and the bit quantity of the PMI corresponding to $W_2$, the PMI of $W_1$ and the PMI of $W_2$ that are fed back by UE.

Step 601 and step 602 may be performed according to the following examples.

The base station determines the bit quantity corresponding to the PMI of $W_1$ and the bit quantity corresponding to the PMI of $W_2$. The base station receives, according to the bit quantity of the PMI of $W_1$ and the bit quantity of the PMI corresponding to $W_2$, at least two PMIs fed back by the UE.

For example, the codebook includes multiple precoding submatrices, where a dimension of some precoding submatrices is 2, and a dimension of some other precoding submatrices is 8. Some submatrices whose dimension is 2 are used as an example.

| Value (three bits) of PMI | Value (two bits) of PMI | Corresponding precoding matrix (vector) |
|---|---|---|
| 000 | 00 | A1 |
| 001 | — | A2 |
| 010 | 01 | A3 |
| 011 | — | A4 |
| 100 | 10 | A5 |
| 101 | — | A6 |
| 110 | 11 | A7 |
| 111 | — | A8 |

If there are eight matrices (A1 to A8) whose dimensions are 2 in a codebook set, when the base station determines that eight bits in a precoding matrix can be used in total, and three bits of the eight bits are used to indicate a matrix whose dimension is 2, it indicates that the base station allocates sufficient bits to the UE, to select, from the eight codebooks A1 to A8, a precoding submatrix (where the precoding submatrix may correspond to the first precoding submatrix in the embodiments shown in FIG. 1 and FIG. 2) corresponding to the measurement result. However, when the base station determines that eight bits in the precoding matrix can be used in total, and only two bits of the eight bits are used to indicate a matrix whose dimension is 2, after the base station notifies the UE, the UE can determine only one of four candidate matrices. In this case, feedback may be performed according to a preset rule, for example, it is determined that 00, 01, 10, and 11 respectively correspond to A1, A3, A5, and A7. In such a manner, accuracy is affected, but air interface bit resources are reduced. In some cases, for example, when a precoding submatrix whose dimension is 2 does not need an extremely accurate indication, but a precoding submatrix whose dimension is 8 needs a relatively accurate indication, a degree of accuracy of the precoding submatrix whose dimension is 8 can be improved by reducing a quantity of bits occupied by a PMI of the precoding submatrix whose dimension is 2. Similarly, when a precoding submatrix whose dimension is 8 does not need an extremely accurate indication, but a precoding submatrix whose dimension is 2 needs a relatively accurate indication, a degree of accuracy of the precoding submatrix whose dimension is 2 can be improved by reducing a quantity of bits occupied by a PMI of the precoding submatrix whose dimension is 8. Currently, because distribution of user equipments differs in different scenarios, for example, in a high-building scenario, there are relatively more users distributed in a vertical direction, in a process of measuring and feeding back a PMI, if more precoding matrices that are more accurate can be provided, a determined precoding matrix can more accurately reflect a channel feature, thereby achieving an objective of improving signal strength. Therefore, more bit values need to be used to determine PMI feedback of the precoding submatrix whose dimension is 2. In a scenario of a broad plain, more dimension bit values need to be used to determine PMI feedback of the precoding submatrix whose dimension is 8. It should be understood that, generally, the base station adjusts the bit quantity for the UE. However, alternatively, the base station may receive a bit allocation message of the UE, and the UE negotiates with the base station about the bit quantity. In addition, the bit quantity of the PMI of $W_1$ and the bit quantity of the PMI corresponding to $W_2$ may be bit quantities of respective PMIs of $W_1$ and $W_2$. If $W_1$ and $W_2$ are in different fields of a same PMI, such bit quantity refers to a case of bit allocation in the field to $W_1$ and $W_2$. When more than two matrices need to be indicated by PMIs, for example, in another embodiment, if it may be further determined that $W_1$ is represented by another two matrices, or it may be further determined that $W_2$ is represented by another two matrices, the base station may determine quantities of bits occupied by PMIs corresponding to multiple matrices.

It should be understood that, in the present disclosure, the bit quantity being 8 and the corresponding table are merely an example. The present disclosure further claims to protect feedback of different bit quantities and a technical solution of adjustment according to bit quantities that includes a form of a table and another type, for example, a mapping type or a formula type of precoding matrix determining manner.

Optionally, the determining, by a base station, a bit quantity corresponding to a PMI of $W_1$ and a bit quantity corresponding to a PMI of $W_2$ specifically includes: receiving a bit indication information, where the bit indication information is used to indicate a bit quantity corresponding to a PMI that needs to be fed back. The indication message may be from the UE or another network device. Optionally, the base station determines the bit quantity corresponding to the PMI of $W_1$ and the bit quantity corresponding to the PMI of $W_2$.

Optionally, step 603: The base station sends bit indication information to the UE, where the bit indication information is used to indicate at least one of the bit quantity corresponding to the PMI of $W_1$ or the bit quantity corresponding to the PMI of $W_2$.

Optionally, the base station may further determine a piece of scenario information. The scenario information is used to indicate the bit quantities corresponding to the PMIs, which need to be fed back by the base station, of $W_1$ and $W_2$ respectively, and configurations, in different directions, that correspond to current communication between the UE and the base station. Herein, the different directions may be the first direction and the second direction, and may be specifically a horizontal direction and a vertical direction respectively.

According to the embodiment shown in FIG. 6, a base station determines a bit quantity corresponding to a PMI of $W_1$ and a bit quantity corresponding to a PMI of $W_2$, and receives the fed back PMIs. The technical solution of this embodiment of the present disclosure can flexibly adjust granularities of fed back bits of the PMIs, so that on same feedback resources, a degree of beam accuracy in a direction is flexibly set, thereby achieving an objective of meeting requirements of various scenarios.

Figure 7:
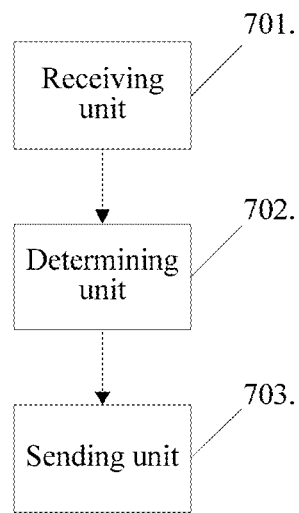
FIG. 7 is a schematic diagram of a UE apparatus for implementing PMI feedback according to an embodiment of the present disclosure.

FIG. 7 is a structural diagram of a communications apparatus according to an embodiment of the present disclosure, and relates to user equipment (UE). The apparatus specifically includes:

a receiving unit 701, configured to receive a reference signal;

a determining unit 702, configured to: determine that a quantity of antenna ports used by a base station to transmit the reference signal is 16, and determine a precoding matrix from a precoding matrix set corresponding to the 16 antenna ports, where the reference signal is received by the receiving unit, and each precoding matrix W in the precoding matrix set satisfies the following relationship: $W=W_1 \otimes W_2$ or $W=W_2 \otimes W_1$, where $W_1$ is a first precoding submatrix, $W_2$ is a second precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2; and a sending unit 703, configured to send a precoding matrix indicator (PMI) corresponding to the precoding matrix to the base station, where the precoding matrix is determined by the determining unit.

According to the embodiment shown in FIG. 7, in a configuration of 16 antenna ports, after performing measurement according to a reference signal to obtain a measurement result, user equipment determines, from only one codebook set, a first precoding matrix whose corresponding dimension is 2 and a second precoding matrix whose dimension is 8, thereby reducing storage resources and air interface configuration resources.

Figure 8:
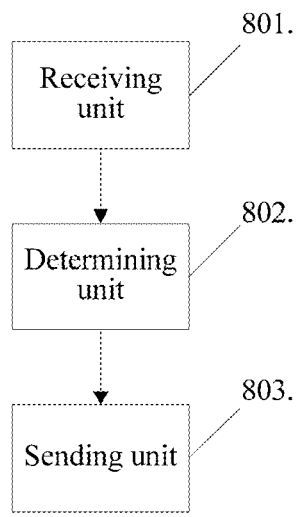
FIG. 8 is a schematic diagram of a UE apparatus for implementing PMI feedback according to an embodiment of the present disclosure.

FIG. 8 is a schematic apparatus diagram of UE for implementing PMI feedback according to an embodiment of the present disclosure. The UE specifically includes the following units.

A receiving unit 801 is configured to receive a reference signal.

A determining unit 802 is configured to: determine that a quantity of antenna ports used by a base station to transmit the reference signal is 16, and determine a precoding matrix from a precoding matrix set corresponding to the 16 antenna ports, where the reference signal is received by the receiving unit, and each precoding matrix W in the precoding matrix set satisfies the following relationship: or $W=W_1 \otimes W_2$ or $W=W_2 \otimes W_1$, is where $W_1$ is a first precoding submatrix, $W_2$ is a second precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2.

It should be understood that, the present disclosure does not limit a specific method for determining, by the determining unit, that a quantity of antenna ports used by the base station to transmit the reference signal is 16. The method may be preconfigured by the UE, or may be determined by means of measurement. In an embodiment, the determining unit may determine the quantity of antenna ports according to the reference signal. Such a determining process may be an implicit determining method. For example, if the receiving unit receives only 16 reference signals, the determining unit can determine the quantity of antenna ports used by the base station to transmit the reference signal. In another embodiment, the quantity of antenna ports used by the base station to transmit the reference signal may not be determined by the determining unit by using the reference signal, but is configured by using some signaling, or has been prestored in the UE by means of presetting or in another manner.

In an embodiment, the determining unit determines the first precoding submatrix and the second precoding submatrix from the precoding matrix set. The determining unit determines the precoding matrix according to the first precoding submatrix and the second precoding submatrix. It should be understood that, the precoding matrix set herein may further be an integration of multiple sets, or a precoding codebook set meeting a condition is determined from a set.

In a 3D MIMO scenario, the determined precoding matrix W is a Kronecker product of the first precoding matrix $W_1$ and the second precoding matrix $W_2$:

$$W = W_1 \otimes W_2.$$

According to a specific property of a Kronecker product, if $W_1$ is a matrix of m1 rows and m2 columns, and $W_2$ is a matrix of n1 rows and n2 columns, the finally determined matrix W is a matrix of m1×n1 rows and m2×n2 columns. In a 3D MIMO scenario with 16 antenna ports, a dimension of W should be 16, so that the base station precodes a signal that needs to be transmitted, and on the UE side, deprecoding is performed. Therefore, a value of m1×n1 or m2×n2 should be 16. The row quantity of the first precoding submatrix is 2, and the row quantity of the second precoding submatrix is 8. Alternatively, the column quantity of the first precoding submatrix is 8, and the column quantity of the second precoding submatrix is 2. It should be understood that, the present disclosure claims to protect all types of variations of the case in which $W = W_1 \otimes W_2$, for example, cases in which $W = W_1^T \otimes W_2^T$ or $W = W_1 \otimes W_2^T$ or $W = W_1^T \otimes W_2$. For the case in which $W = W_1^T \otimes W_2^T$, as described above, dimensions of columns of two matrices are respectively 2 and 8, or dimensions of rows are respectively 2 and 8. One of dimensions of a finally determined precoding matrix W should be 16. In this way, W or a transpose of W may be used to perform precoding or deprecoding on a signal. For the cases in which $W = W_1 \otimes W_2^T$ and $W = W_1^T \otimes W_2$, the row quantity of the first precoding submatrix may be 2 and the column quantity of the second precoding submatrix may be 8; or the column quantity of the first precoding submatrix may be 8 and the row quantity of the second precoding submatrix may be 2. It should be understood that, the present disclosure does not limit in such a manner that another operation step is added after W is determined and before precoding or decoding of precoding is performed on a matrix. For example, vectors with a length of 16 are selected from W, to form another matrix W', and then W' is used for deprecoding. It should be understood that, formula variations that can represent ideas of the present disclosure all fall within the protection scope of the present disclosure.

It should be understood that, the precoding matrix set should be a final selection range. That is, if a set $\{W\}_A$ includes an element V that does not satisfy the relationship: $W = W_1 \otimes W_2$ or $W = W_2 \otimes W_1$, but in a process of finally determining a precoding matrix, V is excluded by using any other condition, the precoding matrix set may not be a final element of $\{W\}_A$. Therefore, for a set $\{W\}_A$ including an element V, if it is determined, through screening by using a condition, that only one of a row quantity or a column quantity of $\{W\}_A'$ is 8 or 2, $\{W\}_A$ falls within the protection scope of the present disclosure. For example, a set $\{W\}_B$ includes an element $V_1$, and a row quantity or a column quantity of $V_1$ is neither 2 nor 8. If it cannot be determined that $V_1$ is either $W_1$ or $W_2$ in any case, $\{W\}_B$ is not the precoding matrix, but $\{W\}_{B'}$ is the precoding matrix. Any element in $\{W\}_{B'}$ may be determined, by means of measurement, as $W_1$ or $W_2$. This also falls within the protection scope of the present disclosure.

In still another embodiment, the first precoding submatrix is a precoding submatrix in a first direction, and the second precoding submatrix is a precoding submatrix in a second direction, or the first precoding submatrix is a precoding submatrix in a second direction and the second precoding submatrix is a precoding submatrix in a first direction.

One precoding matrix may include two precoding submatrices. For example, the two submatrices may be the first precoding submatrix and the second precoding submatrix. In addition, the precoding matrix may be formed in a manner of a product, or in a manner corresponding to an antenna port precoding matrix model of the precoding matrix, for example, in a form of a Kronecker product. The precoding submatrix may have different physical meanings. Sizes of codebooks having different dimensions may be determined according to the physical meanings of the precoding submatrix. For example, for 3D MIMO, each precoding matrix may correspond to two arrangement directions of antenna ports, where either direction may correspond to one precoding submatrix. In a scenario with 16 antenna ports, antenna ports may be configured in different manners according to different directions. In other words, for different arrangement manners, each configuration manner may be considered as a configuration. FIG. 2a, FIG. 2b, FIG. 2c, and FIG. 2d show basic manners of configuring 16 antenna ports.

That is, the 16 antenna ports are configured in any one of the following manners:

two antenna ports are configured in the first direction and eight antenna ports are configured in the second direction;

four antenna ports are configured in the first direction and four antenna ports are configured in the second direction;

eight antenna ports are configured in the first direction and two antenna ports are configured in the second direction; or 16 antenna ports are configured in the first direction and one antenna port is configured in the second direction.

In the 3D MIMO scenario, the precoding matrix may be determined by using a precoding matrix in the first direction and a precoding matrix in the second direction. The precoding matrix in the first direction corresponds to a first antenna port configuration direction. The precoding matrix in the second direction corresponds to a second antenna port configuration direction. The first antenna port configuration direction and the second antenna port configuration direction may be physically actual configuration directions. Alternatively, in a dual-polarized antenna port of 45°, an angle may be considered as one of a vertical or horizontal configuration direction, and the other angle is considered as the other one of the vertical or horizontal configuration direction. The first precoding matrix and the second precoding matrix may be separately precoding matrices in different directions. For example, the precoding matrix in the first direction corresponds to the first direction, and the precoding matrix in the second direction corresponds to the second direction.

Generally, there are four different antenna port configurations for the 16 antenna ports. However, first precoding matrices or second precoding matrices having a same dimension may be determined for the four configurations according to an antenna port configuration direction.

In an embodiment, a precoding matrix in the first direction is a precoding matrix in a horizontal direction, and a precoding matrix in the second direction is a precoding matrix in a vertical direction, or a precoding matrix in the first direction is a precoding matrix in a vertical direction, and a precoding matrix in the second direction is a precoding matrix in a horizontal direction. According to a division manner for the vertical direction and the horizontal direction, more targeted selection may be performed for the antenna port configuration according to user distribution in an actual high-building scenario or a plain scenario. For example, if there are relatively more users in the vertical direction, more antenna ports in the vertical direction may be configured.

In an embodiment, a matrix model $W=W_1 \otimes W_2$ described in the present disclosure may further be decomposed. That is, the precoding matrix satisfies:

$$W=(W_3 \times W_4) \otimes W_2.$$

$W_1=W_3 \otimes W_4$, where $W_3 \times W_4$ is a matrix whose row quantity is 2 and $W_2$ is a matrix whose row quantity is 8, or $W_3 \times W_4$ is a matrix whose column quantity is 2 and $W_2$ is a matrix whose column quantity is 8. Certainly, dimensions of $W_3 \times W_4$ and $W_2$ herein may further be exchanged. For example, $W_3 \times W_4$ is a matrix whose row quantity is 8 and $W_2$ is a matrix whose row quantity is 2, or $W_3 \times W_4$ is a matrix whose column quantity is 8 and $W_2$ is a matrix whose column quantity is 2. That is, the first precoding submatrix is a product of a third precoding submatrix and a fourth precoding submatrix, and/or the second precoding submatrix is a product of a fifth precoding submatrix and a sixth precoding submatrix. $W_3$ and $W_4$ may be two submatrices forming the precoding matrix in the first direction, or $W_4$ may be considered as a weighted matrix of $W_3$. A specific weighting manner may be the same of a non-3D MIMO determining manner. For example, $W_3$ may be used as a long-term wideband-featured matrix, representing a long-term wideband feature of the antenna port in the first direction. $W_4$ may be used as a short-term narrowband-featured matrix, representing a short-term narrowband feature of the antenna port in the first direction. It should be understood that, because one dimension of the first precoding submatrix may be 2, and one dimension of the second precoding submatrix may be 8, when a dimension of $W_2$ is either 8 or 2, a product of $W_3$ and $W_4$ should have a dimension being the other one of 8 or 2. In addition, the present disclosure claims to protect another implementation manner similar to this, for example:

in a form that $W=W_1 \otimes (W_5 \times W_6)$, where $W_2=W_5 \otimes W_6$, or in a form that $W=(W_3 \times W_4) \otimes (W_5 \times W_6)$, and when at least one of the first precoding submatrix or the second precoding submatrix may be indicated in a form of a product of another two matrices, there may be more than two PMIs that need to be fed back. For example, for a form that $W=(W_3 \times W_4) \otimes W_2$, a PMI of $W_3$, a PMI of $W_4$, and a PMI of $W_2$ may be fed back. Some cases in such a form are shown by using examples below: $W_2$ is a matrix whose row quantity is 8, and a row quantity of $W_3$ is 2; or a column quantity of $W_2$ is 8, and a column quantity of $W_4$ is 2; or $W_2$ is a matrix whose row quantity is 2, and a row quantity of $W_3$ is 8; or a column quantity of $W_2$ is 2, and a column quantity of $W_4$ is 8.

It should be understood that, such a form is also applicable to $W=W_1 \otimes (W_5 \times W_6)$: a row quantity of $W_1$ is 8, and a row quantity of $W_5$ is 2; or a column quantity of $W_1$ is 8, and a column quantity of $W_6$ is 2; or a row quantity of $W_1$ is 2, and a row quantity of $W_5$ is 8; or a column quantity of $W_1$ is 2, and a column quantity of $W_6$ is 8.

Similarly, in a form that $W=(W_3 \times W_4) \otimes (W_5 \times W_6)$, a row quantity of $W_3$ is 8, and a row quantity of $W_5$ is 2; or a column quantity of $W_4$ is 8, and a column quantity of $W_6$ is 2; or a row quantity of $W_3$ is 2, and a row quantity of $W_5$ is 8; or a column quantity of $W_4$ is 2, and a column quantity of $W_6$ is 8.

It should be understood that, in this embodiment of the present disclosure, a first precoding matrix whose corresponding dimension is 2 and a second precoding matrix whose dimension is 8 are determined from only one codebook set. Alternatively, there may be two codebook sets, in one codebook set, dimensions are all 2, and in the other codebook set, dimensions are all 8. Alternatively, there are multiple codebook sets, and in the multiple codebook sets, elements are all elements being 2 or 8, but it is finally determined that the dimension of the first precoding matrix is 2 and the dimension of the second precoding matrix is 8. Considering a special case, if matrices in a codebook set include codebooks of other dimensions, these codebooks should not fall within a finally determined range. Optionally, elements in one codebook set are put together to obtain the first precoding matrix or the second precoding matrix, but it is finally determined that dimensions of the first precoding matrix and the second precoding matrix that form the precoding matrix are respectively 2 and 8.

A sending unit 803 is configured to send a precoding matrix indicator (PMI) corresponding to the precoding matrix to the base station. The precoding matrix is determined by the determining unit, and the PMI is used to indicate the precoding matrix.

It should be understood that, the present disclosure does not limit a manner of feeding back the PMI. The PMI may be a field in a piece of signaling, or may be a piece of signaling. In an embodiment, if multiple precoding matrices need to be indicated, there may be multiple PMIs. Alternatively, there may be one PMI, but different parts of the PMI indicate different precoding matrices. For example, in a PMI of eight bits, the first three bits are used to indicate the PMI of the first precoding matrix, and the last five bits are used to indicate the PMI of the second precoding matrix. It should be understood that, in the embodiments of the present disclosure, in terms of a PMI corresponding to a matrix, the matrix may correspond to one field of the PMI, or the matrix may correspond to a single PMI.

Optionally, the determining unit is further configured to determine a bit quantity corresponding to a PMI of $W_1$ and a bit quantity corresponding to a PMI of $W_2$. The UE determines the PMI of $W_1$ and the PMI of $W_2$ according to the bit quantity corresponding to the PMI of $W_1$ and the bit quantity corresponding to the PMI of $W_2$. The sending unit sends the PMI of $W_1$ and the PMI of $W_2$ to the base station. If feedback resources of a PMI are fixed, bits of the PMI are flexibly configured, so that a quantity of elements in a precoding submatrix set can be increased.

In a 3D MIMO scenario with 16 antenna ports, antenna ports can be extended in different directions because of different configuration manners of the antenna ports. The UE device involved in this embodiment determines different antenna port counting manners in different configurations, so that in all the different configurations, a matrix whose dimension is 8 and a matrix whose dimension is 2 are determined in a precoding codebook, and a value of the PMI is fed back to indicate a precoding matrix, thereby reducing configuration signaling and reducing air interface resources.

Because in this embodiment of the present disclosure, in a case of 16 antenna ports, a precoding submatrix whose dimension is 8 and a precoding submatrix whose dimension is 2 in a codebook are used, in addition to a counting effect that can be achieved in the foregoing embodiments, a quantity of precoding submatrices in the codebook can also be increased by using the reduced resources, thereby more accurately meeting an accuracy requirement of a precoding matrix.

The following describes still another embodiment of the present disclosure, where if feedback resources of a PMI are fixed, bits of the PMI are flexibly configured, so that a quantity of elements in a precoding submatrix set can be increased.

In an embodiment, the determining unit is further configured to: determine a bit quantity corresponding to a PMI of $W_1$ and a bit quantity corresponding to a PMI of $W_2$, and determine the PMI of $W_1$ and the PMI of $W_2$ according to the bit quantity corresponding to the PMI of $W_1$ and the bit quantity corresponding to the PMI of $W_2$.

In another embodiment, the determining unit is further configured to control the receiving unit to receive bit indication information sent by the base station. The bit indication information is used to indicate at least one of the bit quantity corresponding to the PMI of $W_1$ or the bit quantity corresponding to the PMI of $W_2$.

Figure 9:
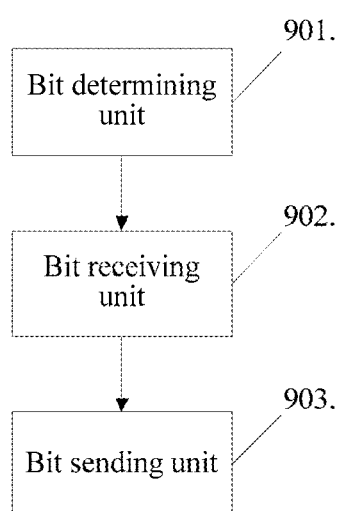
FIG. 9 is a schematic diagram of a UE apparatus for implementing PMI feedback according to an embodiment of the present disclosure.

FIG. 9 shows UE for implementing PMI feedback. It should be understood that, this embodiment may be applied to other embodiments of the present disclosure, or may be implemented as a single embodiment.

A bit determining unit 901 is configured to determine a bit quantity corresponding to a PMI of $W_1$ and a bit quantity corresponding to a PMI of $W_2$. It should be understood that, when being combined with the embodiment of FIG. 7 or FIG. 8, the bit determining unit herein may be the determining unit in the embodiments of FIG. 7 or FIG. 8.

In an embodiment, the determining process may be a process of receiving signaling or an instruction, or a process of determining according to a reference signal, or a process of presetting, or a process of determining according to some other properties.

The bit determining unit 901 is further configured to determine the PMI of $W_1$ and the PMI of $W_2$ according to the bit quantity corresponding to the PMI of $W_1$ and the bit quantity corresponding to the PMI of $W_2$.

The bit determining unit 901 may perform an action according to the following example.

The bit determining unit determines bit quantities corresponding to PMIs in a precoding matrix that need to be fed back. The bit determining unit determines, according to the precoding matrix, the fed back PMIs.

For example, the codebook includes multiple precoding submatrices, where a dimension of some precoding submatrices is 2, and a dimension of some other precoding submatrices is 8. Some submatrices whose dimension is 2 are used as an example.

| Value (three bits) of PMI | Value (two bits) of PMI | Corresponding precoding matrix (vector) |
|---|---|---|
| 000 | 00 | A1 |
| 001 | — | A2 |
| 010 | 01 | A3 |
| 011 | — | A4 |
| 100 | 10 | A5 |
| 101 | — | A6 |
| 110 | 11 | A7 |
| 111 | — | A8 |

If there are eight matrices (A1 to A8) whose dimensions are 2 in a codebook set, when the UE determines that eight bits in a precoding matrix can be used in total, and three bits of the eight bits are used to indicate a matrix whose dimension is 2, it indicates that sufficient bits are allocated to the UE, or the UE determines that the UE has sufficient bits, to select, from the eight codebooks A1 to A8, a precoding submatrix corresponding to the measurement result, where the precoding submatrix may correspond to the first precoding submatrix in the embodiments shown in FIG. 1 and FIG. 2. Specifically, the determining may be performed by the bit determining unit. However, when the bit determining unit determines that eight bits in the precoding matrix can be used in total, and only two bits of the eight bits are used to indicate a matrix whose dimension is 2, the UE can indicate only one of four candidate matrices. In this case, feedback may be performed according to a preset rule, for example, it is determined that 00, 01, 10, and 11 respectively correspond to A1, A3, A5, and A7. In such a manner, accuracy is affected, but air interface bit resources are reduced. In some cases, for example, when a precoding submatrix whose dimension is 2 does not need an extremely accurate indication, but a precoding submatrix whose dimension is 8 needs a relatively accurate indication, a degree of accuracy of the precoding submatrix whose dimension is 8 can be improved by reducing a quantity of bits occupied by a PMI of the precoding submatrix whose dimension is 2. Similarly, when a precoding submatrix whose dimension is 8 does not need an extremely accurate indication, but a precoding submatrix whose dimension is 2 needs a relatively accurate indication, a degree of accuracy of the precoding submatrix whose dimension is 2 can be improved by reducing a quantity of bits occupied by a PMI of the precoding submatrix whose dimension is 8. Currently, because distribution of user equipments differs in different scenarios, for example, in a high-building scenario, there are relatively more users distributed in a vertical direction, in a process of measuring and feeding back a PMI, if more precoding matrices that are more accurate can be provided, a determined precoding matrix can more accurately reflect a channel feature, thereby achieving an objective of improving signal strength. Therefore, more bit values need to be used to determine PMI feedback of the precoding submatrix whose dimension is 2. In a scenario of a broad plain, more dimension bit values need to be used to determine PMI feedback of the precoding submatrix whose dimension is 8. It should be understood that, an order of step 301 and step 302 may be reversed. The bit determining unit may first determine PMIs that need to be fed back, and then adjust accuracy after determining bit quantities of the fed back PMIs. For example, it is determined that a PMI that needs to be fed back is 001, but accuracy of a precoding submatrix in the direction is lower than accuracy of a submatrix in another direction. It may be determined, according to a preset rule, that 00 needs to be fed back as a PMI in the direction, and A1 is used as a precoding matrix in the direction, where A1 and A2 should relatively approximately reflect channel features. In addition, the bit quantity of the PMI of $W_1$ and the bit quantity of the PMI corresponding to $W_2$ may be bit quantities of respective PMIs of $W_1$ and $W_2$. If $W_1$ and $W_2$ are in different fields of a same PMI, such bit quantity refers to a case of bit allocation in the field to $W_1$ and $W_2$. When more than two matrices need to be indicated by PMIs, for example, in another embodiment, if it may be further determined that $W_1$ is represented by another two matrices, or it may be further determined that $W_2$ is represented by another two matrices, the bit determining unit may determine quantities of bits occupied by PMIs corresponding to multiple matrices.

It should be understood that, in the present disclosure, the bit quantity being 8 and the corresponding table are merely an example. The present disclosure further claims to protect feedback of different bit quantities and a technical solution of adjustment according to bit quantities that includes a form of a table and another type, for example, a mapping type or a formula type of precoding matrix determining manner.

Optionally, the determining, by the bit determining unit, bit quantities corresponding to PMIs in a precoding matrix that need to be fed back specifically includes: a bit receiving unit 902, configured to receive a bit indication information sent by a base station, where the bit indication information is used to indicate the bit quantities corresponding to the PMIs that need to be fed back; or determining, by the bit determining unit according to the measurement, the bit quantities corresponding to the PMIs that need to be fed back, where in an embodiment, a bit sending unit 903 is configured to send, to the base station, the bit quantities corresponding to the PMIs that need to be fed back, and sending the bit quantities corresponding to the PMIs to the base station. Similarly, when being combined with the embodiment of FIG. 7 or FIG. 8, the bit receiving unit and the bit sending unit may be the receiving unit and the sending unit respectively.

Optionally, the bit receiving unit may further receive a piece of scenario information. The scenario information is used to indicate configurations, in different directions, of the UE that correspond to current communication between the UE and the base station. Herein, the different directions may be the first direction and the second direction, and may be specifically a horizontal direction and a vertical direction respectively.

According to the embodiment shown in FIG. 9, the bit determining unit determines the bit quantities corresponding to PMIs that need to be fed back, and determines the fed back PMIs according to a precoding matrix and the bit quantities corresponding to the PMIs. The technical solution of this embodiment of the present disclosure can flexibly adjust granularities of fed back bits of the PMIs, so that on same feedback resources, a degree of beam accuracy in a direction is flexibly set, thereby achieving an objective of meeting requirements of various scenarios.

Figure 10:
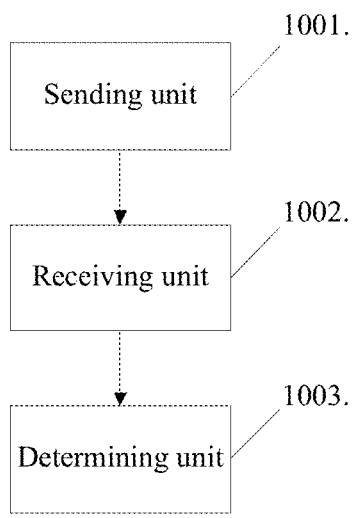
FIG. 10 is a schematic diagram of a base station for implementing PMI feedback according to an embodiment of the present disclosure.

FIG. 10 is a schematic apparatus diagram of base station for implementing PMI feedback according to an embodiment of the present disclosure. The apparatus specifically includes:

a sending unit 1001, configured to send a reference signal to UE by using 16 antenna ports;

a receiving unit 1002, configured to receive a precoding matrix indicator (PMI) fed back by the UE, where the PMI is determined according to the reference signal sent by the sending unit; and a determining unit 1003, configured to determine a precoding matrix corresponding to the PMI from a precoding matrix set corresponding to the 16 antenna ports, where each precoding matrix W in the precoding matrix set satisfies the following relationship: $W=W_1 \otimes W_2$ or $W=W_2 \otimes W_1$, where $W_1$ is a first precoding submatrix, $W_2$ is a second precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2, where the sending unit is further configured to send data to the UE by using the precoding matrix determined by the determining unit.

According to the embodiment shown in FIG. 10, in a configuration of 16 antenna ports, after the sending unit performs measurement by sending a reference signal, to obtain a measurement result, the determining unit determines, from only one codebook set, a first precoding matrix whose corresponding dimension is 2 and a second precoding matrix whose dimension is 8, thereby reducing storage resources and air interface configuration resources.

Figure 11:
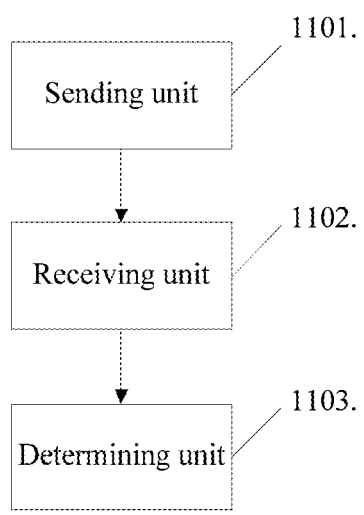
FIG. 11 is a schematic diagram of a base station for implementing PMI feedback according to an embodiment of the present disclosure.

FIG. 11 is a schematic apparatus diagram of base station for implementing PMI feedback according to an embodiment of the present disclosure. The base station specifically includes the following units.

A sending unit 1101 is configured to send a reference signal to UE by using 16 antenna ports.

In an embodiment, before the sending unit sends the reference signal to the UE by using the 16 antenna ports, a determining unit 1103 is further included, and is configured to determine to use a scenario with the 16 antenna ports.

In another embodiment, the sending unit further indicates, to the UE, that a quantity of the antenna ports is 16. For such an indication process, indication may be directly performed by using a piece of signaling, or indication to the UE may be performed in the process of sending the reference signal by the sending unit, or indication may be performed in the process of configuring the UE before the reference signal is sent to the UE by using the 16 antenna ports.

A receiving unit 1102 is configured to receive a precoding matrix indicator (PMI) fed back by the UE, where the PMI is determined according to the reference signal sent by the sending unit.

It should be understood that, the present disclosure does not limit a manner of feeding back the PMI. The PMI may be a field in a piece of signaling, or may be a piece of signaling. In an embodiment, if multiple precoding submatrices need to be indicated, there may be multiple PMIs. Alternatively, there may be one PMI, but different parts of the PMI indicate different precoding submatrices. These precoding submatrices form the precoding matrix according to a preset rule. The preset rule may be in a form of a product or a Kronecker product. For example, in a PMI of eight bits, the first three bits are used to indicate the PMI of the first precoding matrix, and the last five bits are used to indicate the PMI of the second precoding matrix. The first precoding matrix and the second precoding matrix are both precoding submatrices. It should be understood that, in the embodiments of the present disclosure, in terms of a PMI corresponding to a matrix, the matrix may correspond to one field of the PMI, or the matrix may correspond to a single PMI.

Optionally, before the receiving unit receives the precoding matrix indicator (PMI) fed back by the UE, the determining unit is configured to determine a bit quantity of a PMI of $W_1$ and a bit quantity of a PMI corresponding to $W_2$. The receiving unit receives, according to the bit quantity of the PMI of $W_1$ and the bit quantity of the PMI corresponding to $W_2$, at least two PMIs fed back by the UE. Therefore, if feedback resources of a PMI are fixed, bits of the PMI are flexibly configured, so that a quantity of elements in a precoding submatrix set can be increased.

The determining unit is further configured to determine a precoding matrix corresponding to the PMI from a precoding matrix set corresponding to the 16 antenna ports, where each precoding matrix W in the precoding matrix set satisfies the following relationship: $W=W_1 \otimes W_2$ or $W=W_2 \otimes W_1$, where $W_1$ is a first precoding submatrix, $W_2$ is a second precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2.

The sending unit is further configured to send data to the UE by using the precoding matrix determined by the determining unit.

For example, a quantity of PMIs is at least two. The determining, by the determining unit, a precoding matrix corresponding to the at least two PMIs from a precoding matrix set corresponding to the 16 antenna ports includes: determining, by the determining unit, the first precoding submatrix and the second precoding submatrix according to a PMI of the first precoding submatrix and a PMI of the second precoding submatrix; and determining, by the determining unit, the precoding matrix according to the first precoding submatrix and the second precoding submatrix. It should be understood that, the precoding matrix set herein may further be an integration of multiple sets, or a precoding codebook set meeting a condition is determined from a set.

In a 3D MIMO scenario, the determined precoding matrix W is a Kronecker product of the first precoding matrix $W_1$ and the second precoding matrix $W_2$:

$$W=W_1 \otimes W_2.$$

According to a specific property of a Kronecker product, if $W_1$ is a matrix of m1 rows and m2 columns, and $W_2$ is a matrix of n1 rows and n2 columns, the finally determined matrix W is a matrix of m1×n1 rows and m2×n2 columns. In a 3D MIMO scenario with 16 antenna ports, a dimension of W should be 16, so that the base station precodes a signal that needs to be transmitted, and on the UE side, deprecoding is performed. Therefore, a value of m1×n1 or m2×n2 should be 16. The row quantity of the first precoding submatrix is 2, and the row quantity of the second precoding submatrix is 8. Alternatively, the column quantity of the first precoding submatrix is 8, and the column quantity of the second precoding submatrix is 2. It should be understood that, the present disclosure claims to protect all types of variations of the case in which $W=W_1 \otimes W_2$ or the case in which $W=W_2 \otimes W_1$, for example, cases in which $W=W_1^T \otimes W_2^T$ or $W=W_1 \otimes W_2^T$ or $W=W_1^T \otimes W_2$. For the case in which $W=W_1^T \otimes W_2^T$, as described above, dimensions of columns of two matrices are respectively 2 and 8, or dimensions of rows are respectively 2 and 8. One of dimensions of a finally determined precoding matrix W should be 16. In this way, W or a transpose of W may be used to perform precoding on a signal. For the cases in which $W=W_1 \otimes W_2^T$ and $W=W_1^T \otimes W_2$, the row quantity of the first precoding submatrix may be 2 and the column quantity of the second precoding submatrix may be 8; or the column quantity of the first precoding submatrix may be 8 and the row quantity of the second precoding submatrix may be 2. It should be understood that, the present disclosure does not limit in such a manner that another operation step is added after W is determined and before precoding is performed on a matrix. For example, vectors with a length of 16 are selected from W, to form another matrix W', and then W' is used for precoding. It should be understood that, formula variations that can represent ideas of the present disclosure all fall within the protection scope of the present disclosure.

It should be understood that, the precoding matrix set should be a final selection range. That is, if a set $\{W\}_A$ includes an element V that does not satisfy the relationship: $W=W_1 \otimes W_2$ or $W=W_2 \otimes W_1$, but in a process of finally determining a precoding matrix, V is excluded by using any other condition, the precoding matrix set may not be a final element of $\{W\}A$. Therefore, for a set $\{W\}_A$ including an element V, if it is determined, through screening by using a condition, that only one of a row quantity or a column quantity of $\{W\}_{A'}$ is 8 or 2, $\{W\}A$ falls within the protection scope of the present disclosure. For example, a set $\{W\}_B$ includes an element $V_1$, and a row quantity or a column quantity of $V_1$ is neither 2 nor 8. If it cannot be determined that $V_1$ is either $W_1$ or $W_2$ in any case, $\{W\}_B$ is not the precoding matrix, but $\{W\}_{B'}$ is the precoding matrix. Any element in $\{W\}_{B'}$ may be determined, by means of measurement, as $W_1$ or $W_2$. This also falls within the protection scope of the present disclosure.

In still another embodiment, the first precoding submatrix is a precoding submatrix in a first direction, and the second precoding submatrix is a precoding submatrix in a second direction, or the first precoding submatrix is a precoding submatrix in a second direction and the second precoding submatrix is a precoding submatrix in a first direction.

One precoding matrix may include two precoding submatrices. For example, the two submatrices may be the first precoding submatrix and the second precoding submatrix. In addition, the precoding matrix may be formed in a manner of a product, or in a manner corresponding to an antenna port precoding matrix model of the precoding matrix, for example, in a form of a Kronecker product. The precoding submatrix may have different physical meanings. The determining unit may determine, according to the physical meanings of the precoding submatrix, sizes of codebooks having different dimensions. For example, for 3D MIMO, each precoding matrix may correspond to two arrangement directions of antenna ports, where either direction may correspond to one precoding submatrix. In a scenario with 16 antenna ports, antenna ports may be configured in different manners according to different directions. In other words, for different arrangement manners, each configuration manner may be considered as a configuration. Refer to the basic manners of configuring 16 antenna ports shown in FIG. 2a, FIG. 2b, FIG. 2c, and FIG. 2d. Detailed descriptions have been provided in the embodiment shown in FIG. 2, and the descriptions are not repeated herein any further.

That is, the 16 antenna ports are configured in any one of the following manners:

two antenna ports are configured in the first direction and eight antenna ports are configured in the second direction;

four antenna ports are configured in the first direction and four antenna ports are configured in the second direction;

eight antenna ports are configured in the first direction and two antenna ports are configured in the second direction; or 16 antenna ports are configured in the first direction and one antenna port is configured in the second direction.

In the 3D MIMO scenario, the precoding matrix may be determined by using a precoding matrix in the first direction and a precoding matrix in the second direction. The precoding matrix in the first direction corresponds to a first antenna port configuration direction. The precoding matrix in the second direction corresponds to a second antenna port configuration direction. The first antenna port configuration direction and the second antenna port configuration direction may be physically actual configuration directions. Alternatively, in a dual-polarized antenna port of 45°, an angle may be considered as one of a vertical or horizontal configuration direction, and the other angle is considered as the other one of the vertical or horizontal configuration direction. The first precoding matrix and the second precoding matrix may be separately precoding matrices in different directions. For example, the precoding matrix in the first direction corresponds to the first direction, and the precoding matrix in the second direction corresponds to the second direction.

Generally, there are four different antenna port configurations for the 16 antenna ports. However, first precoding matrices or second precoding matrices having a same dimension may be determined for the four configurations according to an antenna port configuration direction.

In an embodiment, a precoding matrix in the first direction is a precoding matrix in a horizontal direction, and a precoding matrix in the second direction is a precoding matrix in a vertical direction, or a precoding matrix in the first direction is a precoding matrix in a vertical direction, and a precoding matrix in the second direction is a precoding matrix in a horizontal direction. According to a division manner for the vertical direction and the horizontal direction, more targeted selection may be performed for the antenna port configuration according to user distribution in an actual high-building scenario or a plain scenario. For example, if there are relatively more users in the vertical direction, more antenna ports in the vertical direction may be configured.

In an embodiment, a matrix model $W=W_1 \otimes W_2$ described in the present disclosure may further be decomposed. That is, the precoding matrix satisfies:

$$W=(W_3 \times W_4) \otimes W_2.$$

$W_1=W_3 \otimes W_4$, where $W_3 \times W_4$ is a matrix whose row quantity is 2 and $W_2$ is a matrix whose row quantity is 8, or $W_3 \times W_4$ is a matrix whose column quantity is 2 and $W_2$ is a matrix whose column quantity is 8. Certainly, dimensions of $W_3 \times W_4$ and $W_2$ herein may further be exchanged. For example, $W_3 \times W_4$ is a matrix whose row quantity is 8 and $W_2$ is a matrix whose row quantity is 2, or $W_3 \times W_4$ is a matrix whose column quantity is 8 and $W_2$ is a matrix whose column quantity is 2. That is, the first precoding submatrix is a product of a third precoding submatrix and a fourth precoding submatrix, and/or the second precoding submatrix is a product of a fifth precoding submatrix and a sixth precoding submatrix. $W_3$ and $W_4$ may be two submatrices forming the precoding matrix in the first direction, or $W_4$ may be considered as a weighted matrix of $W_3$. A specific weighting manner may be the same of a non-3D MIMO determining manner. For example, $W_3$ may be used as a long-term wideband-featured matrix, representing a long-term wideband feature of the antenna port in the first direction. $W_4$ may be used as a short-term narrowband-featured matrix, representing a short-term narrowband feature of the antenna port in the first direction. It should be understood that, because one dimension of the first precoding submatrix may be 2, and one dimension of the second precoding submatrix may be 8, when a dimension of $W_2$ is either 8 or 2, a product of $W_3$ and $W_4$ should have a dimension being the other one of 8 or 2. In addition, the present disclosure claims to protect another implementation manner similar to this, for example:

in a form that $W=W_1 \otimes (W_5 \times W_6)$, where $W_2=W_5 \otimes W_6$, or in a form that $W=(W_3 \times W_4) \otimes (W_5 \times W_6)$, and when at least one of the first precoding submatrix or the second precoding submatrix may be indicated in a form of a product of another two matrices, there may be more than two PMIs that need to be fed back. For example, for a form that $W=(W_3 \times W_4) \otimes W_2$, the receiving unit receives a PMI of $W_3$, a PMI of $W_4$, and a PMI of $W_2$ that are fed back by the UE. Some cases in such a form are shown by using examples below: $W_2$ is a matrix whose row quantity is 8, and a row quantity of $W_3$ is 2; or a column quantity of $W_2$ is 8, and a column quantity of $W_4$ is 2; or $W_2$ is a matrix whose row quantity is 2, and a row quantity of $W_3$ is 8; or a column quantity of $W_2$ is 2, and a column quantity of $W_4$ is 8.

It should be understood that, such a form is also applicable to $W=W_1 \otimes (W_5 \times W_6)$: a row quantity of $W_1$ is 8, and a row quantity of $W_5$ is 2; or a column quantity of $W_1$ is 8, and a column quantity of $W_6$ is 2; or a row quantity of $W_1$ is 2, and a row quantity of $W_5$ is 8; or a column quantity of $W_1$ is 2, and a column quantity of $W_6$ is 8.

Similarly, in a form that $W=(W_3 \times W_4) \otimes (W_5 \times W_6)$, a row quantity of $W_3$ is 8, and a row quantity of $W_5$ is 2; or a column quantity of $W_4$ is 8, and a column quantity of $W_6$ is 2; or a row quantity of $W_3$ is 2, and a row quantity of $W_5$ is 8; or a column quantity of $W_4$ is 2, and a column quantity of $W_6$ is 8.

It should be understood that, in this embodiment of the present disclosure, a first precoding matrix whose corresponding dimension is 2 and a second precoding matrix whose dimension is 8 are determined from only one codebook set. Alternatively, there may be two codebook sets, in one codebook set, dimensions are all 2, and in the other codebook set, dimensions are all 8. Alternatively, there are multiple codebook sets, and in the multiple codebook sets, elements are all elements being 2 or 8, but the dimension of the first precoding matrix finally determined by the determining unit is 2 and the dimension of the second precoding matrix finally determined by the determining unit is 8. Considering a special case, if matrices in a codebook set include codebooks of other dimensions, these codebooks should not fall within a finally determined range. Optionally, elements in one codebook set are put together to obtain the first precoding matrix or the second precoding matrix, but it is finally determined that dimensions of the first precoding matrix and the second precoding matrix that form the precoding matrix are respectively 2 and 8.

Because in this embodiment of the present disclosure, in a case of 16 antenna ports, a precoding submatrix whose dimension is 8 and a precoding submatrix whose dimension is 2 in a codebook are used, in addition to a counting effect that can be achieved in the foregoing embodiments, a quantity of precoding submatrices in the codebook can also be increased by using the reduced resources, thereby more accurately meeting an accuracy requirement of a precoding matrix.

The following describes still another embodiment of the present disclosure, where if feedback resources of a PMI are fixed, bits of the PMI are flexibly configured, so that a quantity of elements in a precoding submatrix set can be increased.

In an embodiment, the determining unit is further configured to determine a bit quantity of a PMI of $W_1$ and a bit quantity of a PMI corresponding to $W_2$. The receiving unit is further configured to receive, according to the bit quantity of the PMI corresponding to $W_1$ and the bit quantity of the PMI corresponding to $W_2$, the PMI of $W_1$ and the PMI of $W_2$ that are fed back by the UE.

Optionally, the determining unit is further configured to control the sending unit to send bit indication information to the UE, where the bit indication information is used to indicate at least one of the bit quantity corresponding to the PMI of $W_1$ or the bit quantity corresponding to the PMI of $W_2$.

Figure 12:
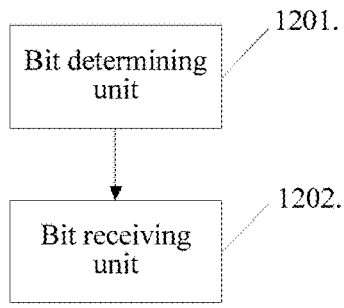
FIG. 12 is a schematic diagram of a base station for implementing PMI feedback according to an embodiment of the present disclosure.

FIG. 12 shows a base station. It should be understood that, this embodiment may be applied to other embodiments, for example, FIG. 10 and FIG. 11, of the present disclosure, or may be implemented as a single embodiment.

A bit determining unit 1201 is configured to determine a bit quantity of a PMI of $W_1$ and a bit quantity of a PMI corresponding to $W_2$.

In an embodiment, the determining process may be a process of receiving signaling or an instruction of another network device, for example, a network element of a core network, or another base station, or a process of determining according to a channel feature, or a process of presetting, or a process of determining according to some other properties.

A bit receiving unit 1202 is configured to receive, according to the bit quantity of the PMI corresponding to $W_1$ and the bit quantity of the PMI corresponding to $W_2$, the PMI of $W_1$ and the PMI of $W_2$ that are fed back by UE.

It should be understood that, when this embodiment is combined with FIG. 10 and FIG. 11, the bit determining unit may be the determining unit, and the bit receiving unit may be the receiving unit.

The bit determining unit determines the bit quantity corresponding to the PMI of $W_1$ and the bit quantity corresponding to the PMI of $W_2$. The bit receiving unit receives, according to the bit quantity of the PMI of $W_1$ and the bit quantity the PMI corresponding to $W_2$, at least two PMIs fed back by the UE.

For example, the codebook includes multiple precoding submatrices, where a dimension of some precoding submatrices is 2, and a dimension of some other precoding submatrices is 8. Some submatrices whose dimension is 2 are used as an example.

| Value (three bits) of PMI | Value (two bits) of PMI | Corresponding precoding matrix (vector) |
|---|---|---|
| 000 | 00 | A1 |
| 001 | — | A2 |
| 010 | 01 | A3 |
| 011 | — | A4 |
| 100 | 10 | A5 |
| 101 | — | A6 |
| 110 | 11 | A7 |
| 111 | — | A8 |

If there are eight matrices (A1 to A8) whose dimensions are 2 in a codebook set, when the bit determining unit determines that eight bits in a precoding matrix can be used in total, and three bits of the eight bits are used to indicate a matrix whose dimension is 2, it indicates that the base station allocates sufficient bits to the UE, to select, from the eight codebooks A1 to A8, a precoding submatrix corresponding to the measurement result. Such an allocation process may be performed by the bit determining unit or an allocation unit. The precoding submatrix may correspond to the first precoding submatrix in the embodiments shown in FIG. 1 and FIG. 2. However, when the bit determining unit determines that eight bits in the precoding matrix can be used in total, and only two bits of the eight bits are used to indicate a matrix whose dimension is 2, after the base station notifies the UE, the UE can determine only one of four candidate matrices. In this case, feedback may be performed according to a preset rule, for example, it is determined that 00, 01, 10, and 11 respectively correspond to A1, A3, A5, and A7. In such a manner, accuracy is affected, but air interface bit resources are reduced. Herein, the notification may be performed by a bit sending unit, but in combination with FIG. 10 and FIG. 11, the notification may be performed by the sending unit. In some cases, for example, when a precoding submatrix whose dimension is 2 does not need an extremely accurate indication, but a precoding submatrix whose dimension is 8 needs a relatively accurate indication, a degree of accuracy of the precoding submatrix whose dimension is 8 can be improved by reducing a quantity of bits occupied by a PMI of the precoding submatrix whose dimension is 2. Similarly, when a precoding submatrix whose dimension is 8 does not need an extremely accurate indication, but a precoding submatrix whose dimension is 2 needs a relatively accurate indication, a degree of accuracy of the precoding submatrix whose dimension is 2 can be improved by reducing a quantity of bits occupied by a PMI of the precoding submatrix whose dimension is 8. Currently, because distribution of user equipments differs in different scenarios, for example, in a high-building scenario, there are relatively more users distributed in a vertical direction, in a process of measuring and feeding back a PMI, if more precoding matrices that are more accurate can be provided, a determined precoding matrix can more accurately reflect a channel feature, thereby achieving an objective of improving signal strength. Therefore, more bit values need to be used to determine PMI feedback of the precoding submatrix whose dimension is 2. In a scenario of a broad plain, more dimension bit values need to be used to determine PMI feedback of the precoding submatrix whose dimension is 8. It should be understood that, generally, the base station adjusts the bit quantity for the UE. However, alternatively, the base station may receive a bit allocation message of the UE, and the UE negotiates with the base station about the bit quantity. In addition, the bit quantity of the PMI of $W_1$ and the bit quantity of the PMI corresponding to $W_2$ may be bit quantities of respective PMIs of $W_1$ and $W_2$. If $W_1$ and $W_2$ are in different fields of a same PMI, such bit quantity refers to a case of bit allocation in the field to $W_1$ and $W_2$. When more than two matrices need to be indicated by PMIs, for example, in another embodiment, if it may be further determined that $W_1$ is represented by another two matrices, or it may be further determined that $W_2$ is represented by another two matrices, the bit determining unit may determine quantities of bits occupied by PMIs corresponding to multiple matrices.

It should be understood that, in the present disclosure, the bit quantity being 8 and the corresponding table are merely an example. The present disclosure further claims to protect feedback of different bit quantities and a technical solution of adjustment according to bit quantities that includes a form of a table and another type, for example, a mapping type or a formula type of precoding matrix determining manner.

Optionally, the determining, by a bit determining unit, a bit quantity corresponding to a PMI of $W_1$ and a bit quantity corresponding to a PMI of $W_2$ specifically includes: receiving, by the bit receiving unit, a bit indication information, where the bit indication information is used to indicate a bit quantity corresponding to a PMI that needs to be fed back. The indication message may be from the UE or another network device. Optionally, the bit determining unit determines the bit quantity corresponding to the PMI of $W_1$ and the bit quantity corresponding to the PMI of $W_2$.

Optionally, the bit determining unit may further determine a piece of scenario information. The scenario information is used to indicate the bit quantities corresponding to the PMIs, which need to be fed back by the base station, of $W_1$ and $W_2$ respectively, and configurations, in different directions, that correspond to current communication between the UE and the base station. Herein, the different directions may be the first direction and the second direction, and may be specifically a horizontal direction and a vertical direction respectively.

According to the embodiment shown in FIG. 12, a base station determines a bit quantity corresponding to a PMI of $W_1$ and a bit quantity corresponding to a PMI of $W_2$, and receives the fed back PMIs. The technical solution of this embodiment of the present disclosure can flexibly adjust granularities of fed back bits of the PMIs, so that on same feedback resources, a degree of beam accuracy in a direction is flexibly set, thereby achieving an objective of meeting requirements of various scenarios.

The following provides a specific embodiment with reference to the embodiments shown in FIG. 3, FIG. 6, FIG. 9, and FIG. 12.

Figure 13:
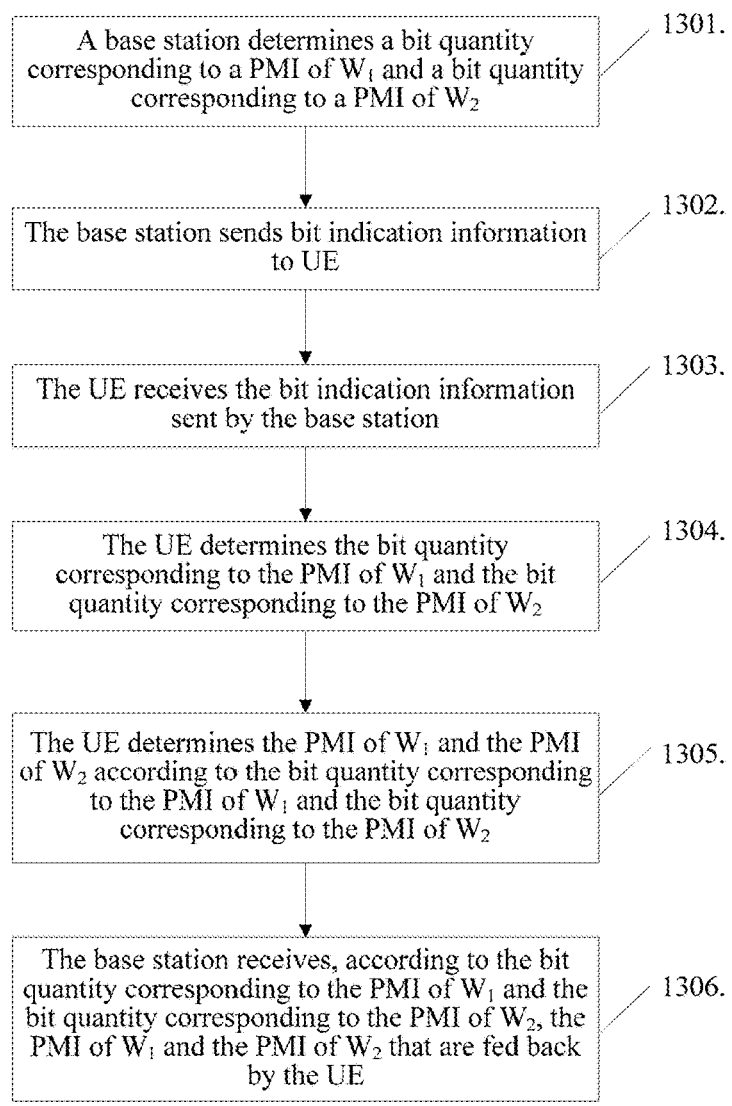
FIG. 13 is a flowchart of a PMI feedback method for implementing interaction between a base station side and a UE side according an embodiment of the present disclosure.

FIG. 13 is a flowchart of a PMI feedback method according to the present disclosure.

Step 1301. A base station determines a bit quantity corresponding to a PMI of $W_1$ and a bit quantity corresponding to a PMI of $W_2$. This step may be performed by a determining unit of the base station.

Step 1302. The base station sends bit indication information to UE, where the bit indication information is used to indicate at least one of the bit quantity corresponding to the PMI of $W_1$ or the bit quantity corresponding to the PMI of $W_2$. This step may be performed by a sending unit of the base station.

Step 1303. The UE receives the bit indication information sent by the base station, where the bit indication information is used to indicate at least one of the bit quantity corresponding to the PMI of $W_1$ or the bit quantity corresponding to the PMI of $W_2$. This step may be the receiving step performed by a receiving unit of the UE.

In an embodiment, in step 1302, the base station may determine a sending mode before sending the bit indication information to the UE. The sending mode may be specifically determined by using a signaling indication. Then a piece of bit indication information is sent. Corresponding to different sending modes, the bit indication information may indicate different PMIs in different forms. The present disclosure provides the following embodiments.

Embodiment 1

In the sending mode, a total quantity of bits occupied by a PMI is determined. In this case, the bit indication information may indicate one of the bit quantity of the PMI of $W_1$ or the bit quantity of the PMI of $W_2$.

Embodiment 2

In the sending mode, a fixed bit quantity corresponding to one of the bit quantity of the PMI of $W_1$ or the bit quantity of the PMI of $W_2$ is determined. In this case, the bit indication information may indicate the other one of the bit quantity of the PMI of $W_1$ or the bit quantity of the PMI of $W_2$.

Step 1304. The UE determines the bit quantity corresponding to the PMI of $W_1$ and the bit quantity corresponding to the PMI of $W_2$. This step may be the determining step performed by a determining unit of the UE.

Step 1305. The UE determines the PMI of $W_1$ and the PMI of $W_2$ according to the bit quantity corresponding to the PMI of $W_1$ and the bit quantity corresponding to the PMI of $W_2$. This step may be the sending step performed by the sending unit of the UE.

Step 1306. The base station receives, according to the bit quantity corresponding to the PMI of $W_1$ and the bit quantity corresponding to the PMI of $W_2$, the PMI of $W_1$ and the PMI of $W_2$ that are fed back by the UE. This step may be the receiving step performed by a receiving unit of the base station.

Figure 14:
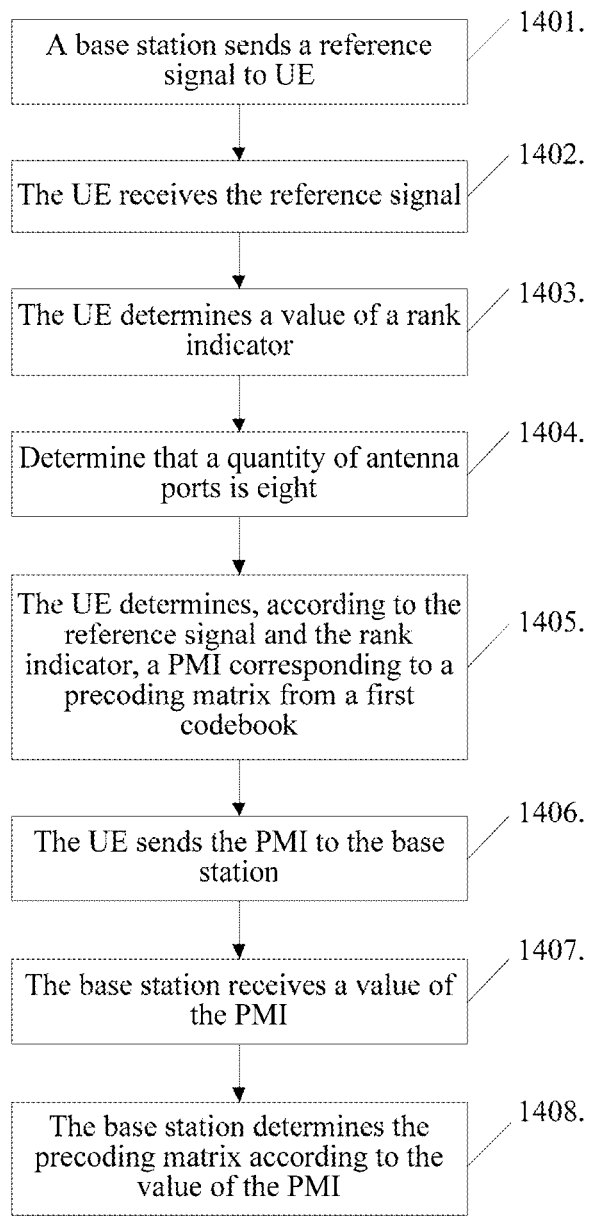
FIG. 14 is a flowchart of a PMI feedback method for implementing interaction between a base station side and a UE side according an embodiment of the present disclosure.

FIG. 14 shows still another system embodiment of the present disclosure, and relates to a terminal apparatus and a base station. The following steps are specifically included.

1401. The base station sends a reference signal to the UE, where a quantity of antenna ports used by the base station to send the reference signal is eight.

1402. The UE receives the reference signal.

1403. The UE determines a value of a rank indicator.

1404. Determine that the quantity of antenna ports is eight.

1405. The UE determines, according to the reference signal and the rank indicator, a PMI corresponding to a precoding matrix from a first codebook, where the first codebook is as follows:

TABLE 1

| | RI = 1 | | | | | | | |
|---|---|---|---|---|---|---|---|---|
| | $i_2$ | | | | | | | |
| $i_1$ | 0 | 1 | 2 | 3 | 4 | 5 | 6 | 7 |
| 0-15 | $W^{(1)}_{2i_1,0}$ | $W^{(1)}_{2i_1,1}$ | $W^{(1)}_{2i_1,2}$ | $W^{(1)}_{2i_1,3}$ | $W^{(1)}_{2i_1+1,0}$ | $W^{(1)}_{2i_1+1,1}$ | $W^{(1)}_{2i_1+1,2}$ | $W^{(1)}_{2i_1+1,3}$ |
| | $i_2$ | | | | | | | |
| $i_1$ | 8 | 9 | 10 | 11 | 12 | 13 | 14 | 15 |
| 0-15 | $W^{(1)}_{2i_1+2,0}$ | $W^{(1)}_{2i_1+2,1}$ | $W^{(1)}_{2i_1+2,2}$ | $W^{(1)}_{2i_1+2,3}$ | $W^{(1)}_{2i_1+3,0}$ | $W^{(1)}_{2i_1+3,1}$ | $W^{(1)}_{2i_1+3,2}$ | $W^{(1)}_{2i_1+3,3}$ | where $W^{(1)}_{m,n} = \frac{1}{\sqrt{8}} \begin{bmatrix} v_m \\ \varphi_n v_m \end{bmatrix}$

TABLE 2

| | RI = 2 | | | |
|---|---|---|---|---|
| | $i_2$ | | | |
| $i_1$ | 0 | 1 | 2 | 3 |
| 0-15 | $W_{2i_1, 2i_1, 0}^{(2)}$ | $W_{2i_1, 2i_1, 1}^{(2)}$ | $W_{2i_1+1, 2i_1+1, 0}^{(2)}$ | $W_{2i_1+1, 2i_1+1, 1}^{(2)}$ |
| | $i_2$ | | | |
| $i_1$ | 4 | 5 | 6 | 7 |
| 0-15 | $W_{2i_1+2, 2i_1+2, 0}^{(2)}$ | $W_{2i_1+2, 2i_1+2, 1}^{(2)}$ | $W_{2i_1+3, 2i_1+3, 0}^{(2)}$ | $W_{2i_1+3, 2i_1+3, 1}^{(2)}$ |
| | $i_2$ | | | |
| $i_1$ | 8 | 9 | 10 | 11 |
| 0-15 | $W_{2i_1, 2i_1+1, 0}^{(2)}$ | $W_{2i_1, 2i_1+1, 1}^{(2)}$ | $W_{2i_1+1, 2i_1+2, 0}^{(2)}$ | $W_{2i_1+1, 2i_1+2, 1}^{(2)}$ |
| | $i_2$ | | | |
| $i_1$ | 12 | 13 | 14 | 15 |
| 0-15 | $W_{2i_1, 2i_1+3, 0}^{(2)}$ | $W_{2i_1, 2i_1+3, 1}^{(2)}$ | $W_{2i_1+1, 2i_1+3, 0}^{(2)}$ | $W_{2i_1+1, 2i_1+3, 1}^{(2)}$ | where $W_{m,m',n}^{(2)} = \frac{1}{4}\begin{bmatrix} v_m & v_{m'} \\ \varphi_n v_m & -\varphi_n v_{m'} \end{bmatrix}$

TABLE 3

| | RI = 3 | | | |
|---|---|---|---|---|
| | $i_2$ | | | |
| $i_1$ | 0 | 1 | 2 | 3 |
| 0-3 | $W_{8i_1, 8i_1, 8i_1+8}^{(3)}$ | $W_{8i_1+8, 8i_1, 8i_1+8}^{(3)}$ | $\tilde{W}_{8i_1, 8i_1+8, 8i_1+8}^{(3)}$ | $\tilde{W}_{8i_1+8, 8i_1, 8i_1}^{(3)}$ |
| | $i_2$ | | | |
| $i_1$ | 4 | 5 | 6 | 7 |
| 0-3 | $W_{8i_1+2, 8i_1+2, 8i_1+10}^{(3)}$ | $W_{8i_1+10, 8i_1+2, 8i_1+10}^{(3)}$ | $\tilde{W}_{8i_1+2, 8i_1+10, 8i_1+10}^{(3)}$ | $\tilde{W}_{8i_1+10, 8i_1+2, 8i_1+2}^{(3)}$ |
| | $i_2$ | | | |
| $i_1$ | 8 | 9 | 10 | 11 |
| 0-3 | $W_{8i_1+4, 8i_1+4, 8i_1+12}^{(3)}$ | $W_{8i_1+12, 8i_1+4, 8i_1+12}^{(3)}$ | $\tilde{W}_{8i_1+4, 8i_1+12, 8i_1+12}^{(3)}$ | $\tilde{W}_{8i_1+12, 8i_1+4, 8i_1+4}^{(3)}$ |
| | $i_2$ | | | |
| $i_1$ | 12 | 13 | 14 | 15 |
| 0-3 | $W_{8i_1+6, 8i_1+6, 8i_1+14}^{(3)}$ | $W_{8i_1+14, 8i_1+6, 8i_1+14}^{(3)}$ | $\tilde{W}_{8i_1+6, 8i_1+14, 8i_1+14}^{(3)}$ | $\tilde{W}_{8i_1+14, 8i_1+6, 8i_1+6}^{(3)}$ | where $W_{m,m',m''}^{(3)} = \frac{1}{\sqrt{24}}\begin{bmatrix} v_m & v_{m'} & v_{m''} \\ v_m & -v_{m'} & -v_{m''} \end{bmatrix}$, $\tilde{W}_{m,m',m''}^{(3)} = \frac{1}{\sqrt{24}}\begin{bmatrix} v_m & v_{m'} & v_{m''} \\ v_m & v_{m'} & -v_{m''} \end{bmatrix}$

TABLE 4

| | RI = 4 | | | |
|---|---|---|---|---|
| | $i_2$ | | | |
| $i_1$ | 0 | 1 | 2 | 3 |
| 0-3 | $W_{8i_1, 8i_1+8, 0}^{(4)}$ | $W_{8i_1, 8i_1+8, 1}^{(4)}$ | $W_{8i_1+2, 8i_1+10, 0}^{(4)}$ | $W_{8i_1+2, 8i_1+10, 1}^{(4)}$ |
| | $i_2$ | | | |
| $i_1$ | 4 | 5 | 6 | 7 |
| 0-3 | $W_{8i_1+4, 8i_1+12, 0}^{(4)}$ | $W_{8i_1+4, 8i_1+12, 1}^{(4)}$ | $W_{8i_1+6, 8i_1+14, 0}^{(4)}$ | $W_{8i_1+6, 8i_1+14, 1}^{(4)}$ | where $W_{m,m',n}^{(4)} = \frac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$

TABLE 5

| | RI = 5 | |
|---|---|---|
| | | $i_2$ |
| $i_1$ | | 0 |
| 0-3 | $W_{i_1}^{(5)} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ | |

TABLE 6

| | RI = 6 | |
|---|---|---|
| | | $i_2$ |
| $i_1$ | | 0 |
| 0-3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ | |

TABLE 7

| | RI = 7 | |
|---|---|---|
| | | $i_2$ |
| $i_1$ | | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ | |

TABLE 8

| | RI = 8 | |
|---|---|---|
| | | $i_2$ |
| $i_1$ | | 0 |
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ | |

A PMI 1 may be i1, a PMI 2 may be i2, Win the tables is each codebook, $\varphi_n = e^{j\pi n/2}$, $v_m = v_l \otimes v_k$, $v_k = [1 \; e^{j2\pi k/K}]^T$, $v_l = [1 \; e^{j2\pi l/L}]^T$, and m, l, and K satisfy: m=l×K+k, k=mMOD K, and l=⌊m/K⌋.

In an embodiment, a value of K is 8, and a value of L is 4.

1406. The UE sends the PMI to the base station.

1407. The base station receives a value of the PMI.

1408. The base station determines the precoding matrix according to the value of the PMI.

Optionally, the present disclosure does not limit logical changes in orders of the steps, and combination, division, and modification of the apparatuses.

It should be understood that, in the apparatus embodiments of the present disclosure, apparatuses may be in various forms of entity apparatuses. For example, in the apparatus embodiments of the present disclosure, a sending unit may be a transmitter, or may be an antenna or an antenna system. A receiving unit may be a receiver, or may be an antenna or an antenna system. The transmitter and the receiver may be a transceiver, or may be combined into an antenna or an antenna system. The determining unit may be one or more processors. A codebook, signaling, or a preset rule, or other content that needs to be stored of the present disclosure may be stored in a storage unit, which may be specifically implemented in a form of a memory.

The processor may be a general-purpose processor, for example, a general-purpose central processing unit (CPU), a network processor (NP), or a micro-processor, or may be an application-specific integrated circuit (ASIC), or one or more integrated circuits for controlling execution of programs of solutions of the present disclosure, or may be a digital signal processor (DSP), an application-specific integrated circuit (ASIC), a field programmable gate array (FPGA), or another programmable logical device, discrete gate or transistor logical device, or discrete hardware component. Alternatively, multiple processors may implement different functions.

The memory stores a program for executing the technical solutions of the present disclosure, and may further store an operating system and another application program. Specifically, the program may include program code, where the program code includes a computer operation instruction. More specifically, the memory may be a read-only memory (ROM), another type of static storage device that can store static information and an instruction, a random access memory (RAM), another type of dynamic storage device that can store information and an instruction, a magnetic disk storage, or the like. Alternatively, different memories may be used for storage.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A precoding matrix indicator (PMI) feedback method, comprising:
   receiving, by user equipment (UE), a reference signal;
   determining, by the UE, that a quantity of antenna ports used by a base station to transmit the reference signal is 16;
   determining, by the UE, a precoding matrix from a precoding matrix set corresponding to the 16 antenna ports, wherein each precoding matrix W in the precoding matrix set satisfies the following relationship: $W=W_1 \otimes W_2$ or $W=W_2 \otimes W_1$, wherein $W_1$ is a first precoding submatrix, $W_2$ is a second precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2; and
   sending, by the UE, a precoding matrix indicator (PMI) corresponding to the precoding matrix to the base station.

2. The method according to claim 1, wherein determining, by the UE, the precoding matrix from the precoding matrix set comprises:
   determining, by the UE, the first precoding submatrix and the second precoding submatrix from the precoding matrix set; and
   determining, by the UE, the precoding matrix according to the first precoding submatrix and the second precoding submatrix.

3. The method according to claim 1, wherein:
   the first precoding submatrix is a precoding submatrix in a first direction, and the second precoding submatrix is a precoding submatrix in a second direction; or
   the first precoding submatrix is a precoding submatrix in a second direction and the second precoding submatrix is a precoding submatrix in a first direction.

4. The method according to claim 1, further comprising:
   determining, by the UE, a bit quantity corresponding to a PMI of $W_1$ and a bit quantity corresponding to a PMI of $W_2$;
   determining, by the UE, the PMI of $W_1$ and the PMI of $W_2$ according to the bit quantity corresponding to the PMI of $W_1$ and the bit quantity corresponding to the PMI of $W_2$; and
   sending, by the UE, the precoding matrix indicator (PMI) corresponding to the precoding matrix to the base station comprises:
   sending the PMI of $W_1$ and the PMI of $W_2$ to the base station.

5. The method according to claim 4, wherein determining, by the UE, the bit quantity corresponding to the PMI of $W_1$ and the bit quantity corresponding to the PMI of $W_2$ comprises:
   receiving, by the UE, bit indication information sent by the base station, wherein the bit indication information is used to indicate at least one of the bit quantity corresponding to the PMI of $W_1$ or the bit quantity corresponding to the PMI of $W_2$.

6. A precoding matrix indicator (PMI) feedback method, comprising:
   sending, by a base station, a reference signal to a user equipment (UE) by using 16 antenna ports;
   receiving, by the base station, a precoding matrix indicator (PMI) fed back by the UE;
   determining, by the base station, a precoding matrix corresponding to the PMI from a precoding matrix set corresponding to the 16 antenna ports, wherein each precoding matrix W in the precoding matrix set satisfies the following relationship: $W=W_1 \otimes W_2$ or $W=W_2 \otimes W_1$, wherein $W_1$ is a first precoding submatrix, $W_2$ wherein a first precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2; and
   sending, by the base station, data to the UE by using the precoding matrix.

7. The method according to claim 6, wherein:
   a quantity of PMIs is at least two; and
   determining, by the base station, the precoding matrix from the precoding matrix set corresponding to the 16 antenna ports comprises:
   determining, by the base station, the first precoding submatrix and the second precoding submatrix according to a PMI of the first precoding submatrix and a PMI of the second precoding submatrix; and
   determining, by the base station, the precoding matrix according to the first precoding submatrix and the second precoding submatrix.

8. The method according to claim 6, wherein:
   the first precoding submatrix is a precoding submatrix in a first direction, and the second precoding submatrix is a precoding submatrix in a second direction; or
   the first precoding submatrix is a precoding submatrix in a second direction and the second precoding submatrix is a precoding submatrix in a first direction.

9. The method according to claim 6, further comprising:
   determining, by the base station, a bit quantity corresponding to the PMI of $W_1$ and a bit quantity corresponding to the PMI of $W_2$; and
   receiving, by the base station according to the bit quantity of the PMI corresponding to $W_1$ and the bit quantity of the PMI corresponding to $W_2$, the PMI of $W_1$ and the PMI of $W_2$ that are fed back by the UE.

10. The method according to claim 9, further comprising:
    sending, by the base station, bit indication information to the UE, wherein the bit indication information is used to indicate at least one of the bit quantity corresponding to the PMI of $W_1$ or the bit quantity corresponding to the PMI of $W_2$.

11. User equipment (UE), comprising:
a receiving unit, configured to receive a reference signal;
a determining unit, configured to:
  determine that a quantity of antenna ports used by a base station to transmit the reference signal is 16; and
  determine a precoding matrix from a precoding matrix set corresponding to the 16 antenna ports;
  wherein the reference signal is received by the receiving unit, and each precoding matrix W in the precoding matrix set satisfies the following relationship: $W=W_1 \otimes W_2$ or $W=W_2 \otimes W_1$, wherein $W_1$ is a first precoding submatrix, $W_2$ is a second precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2; and
a sending unit, configured to send a precoding matrix indicator (PMI) corresponding to the precoding matrix to the base station, wherein the precoding matrix is determined by the determining unit.

12. The UE according to claim 11, wherein the determining unit is further configured to:
  determine the first precoding submatrix and the second precoding submatrix from the precoding matrix set; and
  determine the precoding matrix according to the first precoding submatrix and the second precoding submatrix.

13. The UE according to claim 11, wherein:
the first precoding submatrix is a precoding submatrix in a first direction, and the second precoding submatrix is a precoding submatrix in a second direction; or
the first precoding submatrix is a precoding submatrix in a second direction and the second precoding submatrix is a precoding submatrix in a first direction.

14. The UE according to claim 11, wherein the determining unit is further configured to:
  determine a bit quantity corresponding to a PMI of $W_1$ and a bit quantity corresponding to a PMI of $W_2$; and
  determine the PMI of $W_1$ and the PMI of $W_2$ according to the bit quantity corresponding to the PMI of $W_1$ and the bit quantity corresponding to the PMI of $W_2$.

15. The UE according to claim 14, wherein the determining unit is further configured to control the receiving unit to receive bit indication information sent by the base station, wherein the bit indication information is used to indicate at least one of the bit quantity corresponding to the PMI of $W_1$ or the bit quantity corresponding to the PMI of $W_2$.

16. A base station, comprising:
a sending unit, configured to send a reference signal to a user equipment (UE) by using 16 antenna ports;
a receiving unit, configured to receive a precoding matrix indicator (PMI) fed back by the UE, wherein the PMI is determined according to the reference signal sent by the sending unit; and
a determining unit, configured to determine a precoding matrix corresponding to the PMI received by the receiving unit from a precoding matrix set corresponding to the 16 antenna ports, wherein each precoding matrix W in the precoding matrix set satisfies the following relationship: $W=W_1 \otimes W_2$ or $W=W_2 \otimes W_1$, wherein $W_1$ is a first precoding submatrix, $W_2$ is a second precoding submatrix, $\otimes$ indicates a Kronecker product, and a row quantity of the first precoding submatrix is 2 and a row quantity of the second precoding submatrix is 8, or a column quantity of the first precoding submatrix is 8 and a column quantity of the second precoding submatrix is 2;
wherein the sending unit is further configured to send data to the UE by using the precoding matrix determined by the determining unit.

17. The base station according to claim 16, wherein:
a quantity of PMIs is at least two; and
the determining unit is further configured to:
  determine the first precoding submatrix and the second precoding submatrix according to a PMI of the first precoding submatrix and a PMI of the second precoding submatrix; and
  determine the precoding matrix according to the first precoding submatrix and the second precoding submatrix.

18. The base station according to claim 16, wherein:
the first precoding submatrix is a precoding submatrix in a first direction, and the second precoding submatrix is a precoding submatrix in a second direction; or
the first precoding submatrix is a precoding submatrix in a second direction and the second precoding submatrix is a precoding submatrix in a first direction.

19. The base station according to claim 16, wherein:
the determining unit is further configured to determine a bit quantity of a PMI of $W_1$ and a bit quantity of a PMI corresponding to $W_2$; and
the receiving unit is further configured to receive, according to the bit quantity of the PMI corresponding to $W_1$ and the bit quantity of the PMI corresponding to $W_2$, the PMI of $W_1$ and the PMI of $W_2$ that are fed back by the UE.

20. The base station according to claim 19, wherein the determining unit is further configured to control the sending unit to send bit indication information to the UE, wherein the bit indication information is used to indicate at least one of the bit quantity corresponding to the PMI of $W_1$ or the bit quantity corresponding to the PMI of $W_2$.

* * * * *